United States Patent Office 3,549,427
Patented Dec. 22, 1970

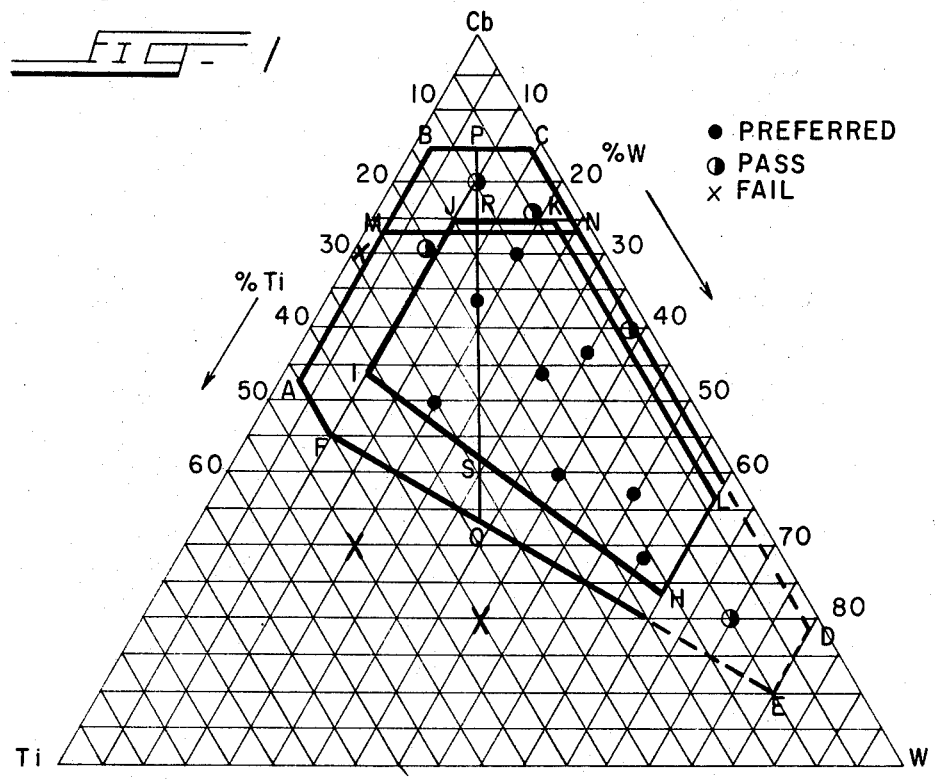
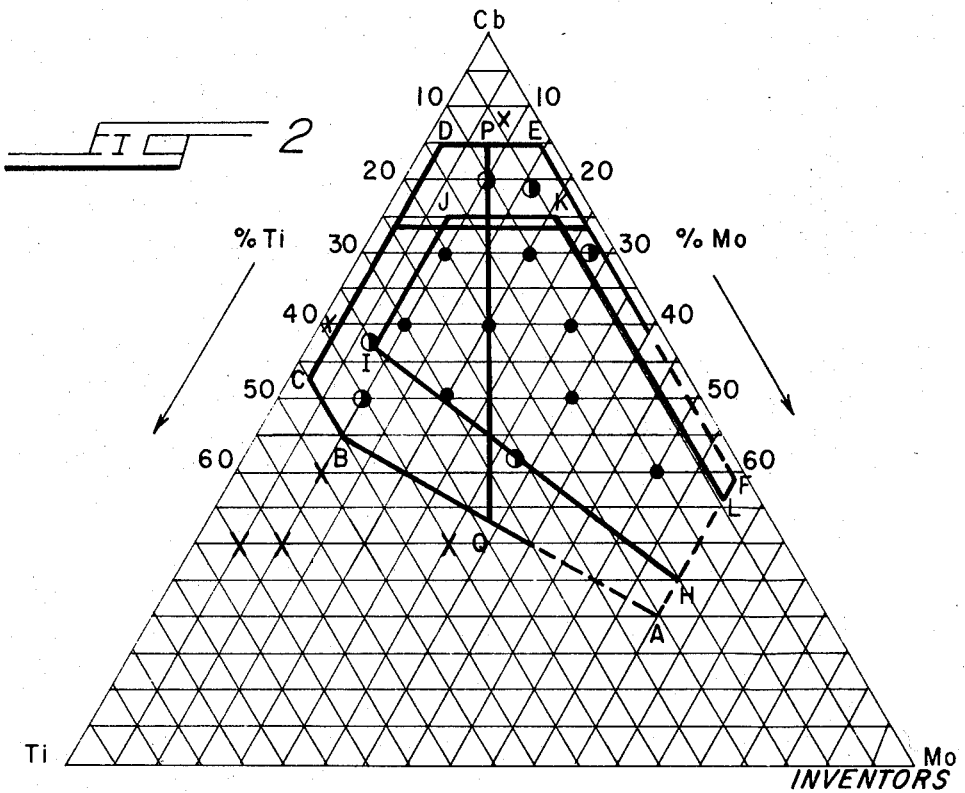

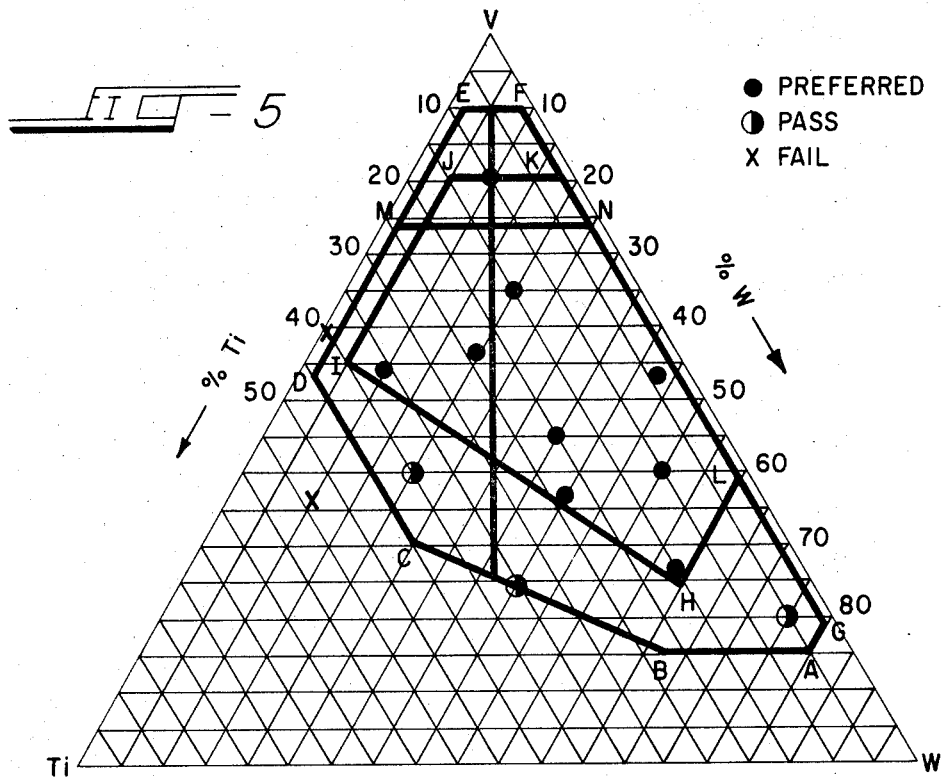
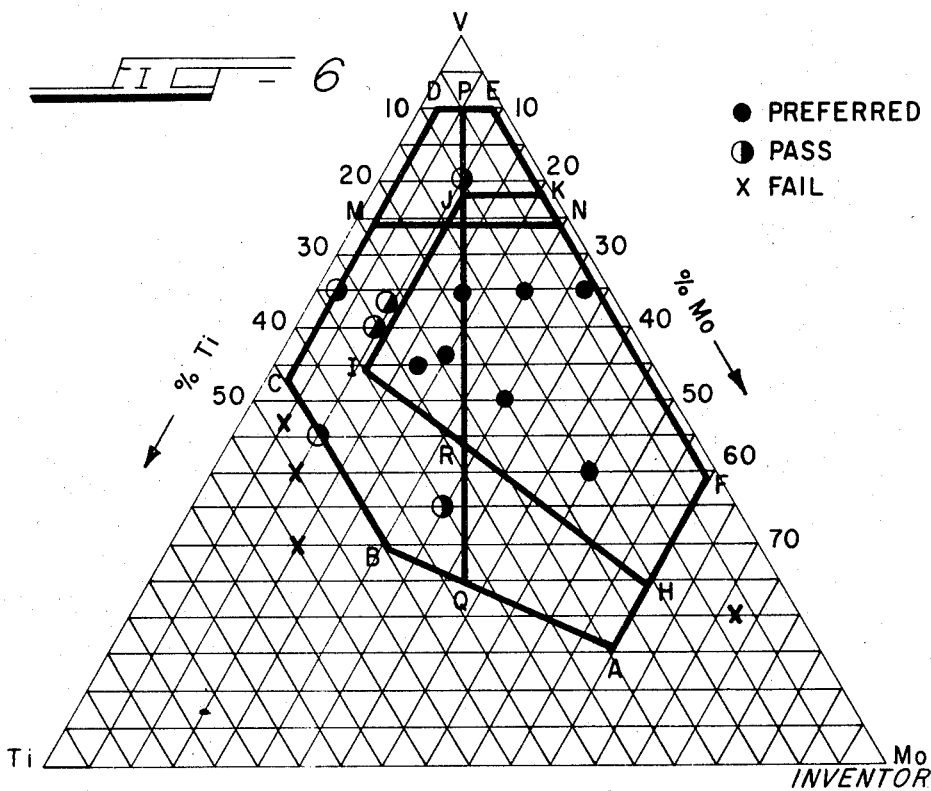

3,549,427
WEAR RESISTANT MATERIALS
John J. Rausch, Antioch, and Ray J. Van Thyne, Oak Lawn, Ill., assignors to Surface Technology Corporation, Stone Park, Ill., a corporation of Illinois
Continuation-in-part of application Ser. No. 665,510, Sept. 5, 1967. This application Aug. 27, 1968, Ser. No. 755,658
Int. Cl. C23c *11/14, 9/00*
U.S. Cl. 148—31.5                    42 Claims

ABSTRACT OF THE DISCLOSURE

Nitrided materials consisting essentially of at least one metal selected from each of the Groups A, B and C wherein Group A consists of columbium and/or tantalum and/or vanadium; Group B is titanium, and Group C is tungsten and/or molybdenum. Such nitrided metals are characterized by excellent wear and abrasion resistance and illustrate utility as cutting tools. Includes certain novel alloy materials.

CROSS REFERENCE TO RELATED APPLICATION

This application is a continuation-in-part of our copending application Ser. No. 665,510 entitled "Composite Structures" filed Sept. 5, 1967, now abandoned.

BACKGROUND OF THE INVENTION

This invention relates to a novel group of nitrided ternary or higher alloyed metals which alloys contain essentially:

(A) one or more metals of the group columbium, tantalum and vanadium;
(B) titanium; and
(C) molybdenum or tungsten or both in amounts by percent by weight as hereinafter set forth. We have discovered that such alloys when nitrided as herein taught form extremely useful high speed cutting materials (although they have other uses also) and offer considerable advantages in terms of cutter life, fabricability, performance and cost over presently known cutting tool materials, especially the sintered carbides. In addition such materials have excellent wear and abrasion resistance characteristics, all of which is hereinafter described. The commercial and technical significance of our invention will be immediately apparent to those skilled in this particular art. In addition we have discovered a novel group of very desirable alloys.

Accordingly, a principal object of our invention is to provide novel, nitrided alloys consisting essentially of: (A) one or more metals of the group columbium, tantalum and vanadium; (B) titanium; and (C) one or more metals of the group molybdenum and tungsten.

Another object of our invention is to provide such novel nitrided alloys wherein certain critical amounts of titanium to metal or metals of Group A aforesaid are required.

Still a further object of our invention is to provide a number of novel alloys which either upon being nitrided offer considerable utility or have certain additional uses per se.

These, and other objects, features and advantages of our invention will become apparent to those skilled in this particular art from the following detailed disclosure thereof and from the accompanying drawings.

DESCRIPTION OF THE PRIOR ART AND FURTHER BACKGROUND COMMENTS

To the best of our knowledge the products of our invention, which are fully set forth as this description proceeds, are nowhere described in the prior art. We have found nothing in the art which in anyway indicates the nitrided alloy composites of this disclosure or the utility thereof. In fact, there are certain teachings in the art which would indicate that the nitrided alloys of our invention would be too brittle to be useful and accordingly it is with some surprise that the utility of such materials is as we have discovered.

We would note, however, that generally speaking, the reaction of various metals and alloys with the compound forming elements, carbon, oxygen and nitrogen to improve surface properties or in some instances, to develop certain composite materials is known. Most of the prior work along these lines has involved the carburizing or nitriding of ferrous base materials and there is extensive literature as regards that field.

In such prior art processes the compound forming element, usually is in the gaseous phase. Reaction temperatures vary from as low as 800° F. for ferrous metals to from 3500° F. to 5000° F. for tantalum and tungsten. (See: M. R. Andrews, J. Am. Chem. Soc. 54:18–45 (1932); also U.S. Pat. 3,163,563.) The reaction product may be a continuous nitride, carbide or oxide layer formed on the metal surface, or an internal dispersion of the compound phase formed within the metal, or combination of these two.

It is also known that if an alloy consisting of copper with small amounts of aluminum is exposed to oxygen at elevated temperatures the oxygen goes into solution at the alloy surface, diffuses therein and reacts with the aluminum to form an aluminum oxide dispersion in a copper matrix. A similar effect occurs when molybdenum, alloyed with minor amounts of titanium and/or zirconium (i.e., up to 1.5%) is exposed to molecular nitrogen at elevated temperatures. A dispersion of titanium nitride and/or zirconium nitride is found within the molybdenum. (See: A. K. Mukherjie and J. W. Martin, J. of the Less Common Metals, 393 (1960).) With both such minor additions dispersions strengthened composites are produced.

Furthermore, it is known in the art that the nitriding at elevated temperatures of elemental tantalum, columbium or titanium, or dilute titanium alloys, generally results in the formation of continuous, hard nitrided surface layers thereon. These layers would usually be characterized as being brittle. Similarly, the carburizing of tantalum results in the formation of hard, continuous carbide surface layers. Additionally, if the tantalum is alloyed prior to carburizing substantial improvements in the adherence of the resulting layers to the substrate can be achieved. (See U.S. Pat. 3,163,563.) Similar improvements and modifications in phase distribution and surface layer adherence have been observed when columbium is alloyed with zirconium or titanium prior to oxidation.

In distinction to all of these prior art teachings, our invention relates chiefly to the making of an exceptionally useful group of materials which result from the reaction of certain alloy compositions with a nitrogen environment. Such alloy compositions contain columbium (Cb) and/or tantalum (Ta) and/or vanadium (V) as one constitutent. Titanium (Ti) is the second constituent. A small amount (up to 3% thereof) of the titanium may be replaced with zirconium (Zr). The third principal constituent is molybdenum (Mo) or tungsten (W) or both. Minor amounts of other materials and metals may be present either as impurities or as non-detrimental diluents which do not affect the basic teachings of our discovery. Upon being nitrided the present materials are characterized by a desirable combination of mechanical properties which make them extremely useful particularly under severe conditions of erosion or abrasion. Our invention also covers some novel alloy systems per se.

We would also note that the prior art indicates that when the elemental metals columbium, tantalum, vanadium or titanium are reacted at elevated temperatures in molecular nitrogen at one atmosphere pressure continuous nitride and subnitride layers are formed on the surface. In addition discrete particles of subnitride or solid solution phases may form below these outer layers. Such nitrided metallic elements are in no way comparable in properties or utility to the nitrided structures of our invention. Although the hard outer layers have high hardness their structural value is quite limited. Their ability to support a mechanical load is poor as measured by tests which include diamond indentation, metal cutting and abrasion or impact under high load. Such materials are further characterized as having poor strength, little toughness and poor resistance to chipping or spalling. As is subsequently shown herein we have found that it is necessary to eliminate the continuity of the nitrided layers by using materials in which composition and properties are graduated in a mostly continuous fashion in order to achieve maximum performance for the test conditions described herein.

SUMMARY OF THE INVENTION

We have found that truly effective nitrided composites falling within the scope hereof can only be produced when certain combinations of metals in specific ranges and ratios are present in the alloys prior to nitriding. As noted above the present alloys prior to being nitrided must contain at least three metallic components, viz:

(A) one or more of the metals columbium, tantalum and vanadium;
(B) titanium; and
(C) one or both of the metals molybdenum and tungsten.

When columbium is used alone of Group A it ranges in content from about 10% to 85% by weight. (All percentages in the present specification and claims are by weight unless otherwise noted.) When tantalum is used alone it ranges from about 25% to 88% and when vanadium is used alone it ranges from about 15% to 90%.

For those alloys of this invention wherein two or more of such Group A metals are employed the combination ranges are subsequently described.

We find that titanium in all cases must be a relatively minor constituent of the three or more component alloy system; i.e., it must be present in amounts less than 45% by weight and in our preferred materials is present in amounts considerably lower than this. Furthermore, and of critical importance to the successful utilization of the teaching hereof there must be less titanium present than either columbium or tantalum or both. When vanadium alone is used of such Group A metals useful nitrided materials have been made in which there is slightly more titanium than vanadium. (The V:Ti ratio may be as low as 0.66:1), but it is preferred here too that the vanadium content be higher than that of titanium. When two or more of such Group A are used it is also preferred that their total content exceed that of the titanium present.

A small amount (i.e., up to 3%) of the titanium may be replaced by zirconium without detracting from the utility of the present materials.

Of the Group C metals to be used herein, molybdenum if present along ranges from 2% to 60% if used with columbium and/or vanadium and from 2% to 50% if used with tantalum alone of the Group A metals. Tungsten, if present alone ranges from 2% to 80%. In a subsequent section hereof we shall consider the compositional limitations required when both molybdenum and tungsten are present in these alloy systems. Furthermore, the amount of molybdenum and/or tungsten required is dependent on the quantities of the other materials.

Thus, our invention is principally directed to nitrided materials consisting essentially of the alloy system (Cb, Ta, V)-(Ti[Zr]-(Mo, W) and covers a number of desirable composites ranging from a three component to a seven component alloy if zirconium replaces a portion of the titanium. In addition there may be present either or both of minor impurities or diluent metals which do not detract from the desirable properties of the nitrided materials.

Furthermore, as is likewise set forth below in some detail within such compositional range aforesaid there are certain preferred compositions in terms of meeting the rather severe cutting test criteria we have established or materials for wear and abrasion resistance or materials which are more readily fabricated than others. All of the present materials of the alloy system when nitrided may be used for cutting tools but these other aspects of the invention are also significant.

An important aspect of our invention lies in the achievement of high hardness and wear-resistance coupled with good toughness or chipping resistance in the same material. Normally it is quite difficult to develop a good balance between these properties while maintaining them at a relatively high value. For example, the wide usage of sintered carbides for wear and cutting purposes stems from a balance of such properties therein. (Yet we find that our materials are superior to and offer many advantages over the sintered carbides.) Although ceramic materials such as alumina may be much harder than sintered carbide their utilization is limited due to chipping.

We have used metal cutting tests at 100 and 750 surface feet per minute as a primary experimental evaluation technique since these are highly reproducible and metal cutting will certainly be one of the principal uses of the present materials. Cutting hardened steel at high speeds—750 s.f.m.—is a good measure of the high performance wear resistance of the material. At relatively low speeds (100 s.f.m.), the chipping propensity of the material under load can be evaluated. These inter-relationships will be more clearly understood as this description proceeds.

We are confident that to those skilled in this art such tests will appear quite severe but we have been able to develop a new family of materials which fulfill such requirements to a superb degree.

BRIEF DESCRIPTION OF THE DRAWINGS

In the drawings appended hereto:
FIG. 1 is a ternary diagram for nitrided alloys in the columbium-tungsten-titanium system;
FIG. 2 is a ternary diagram for nitrided alloys in the columbium-molybdenum-titanium system;
FIG. 5 is a ternary diagram for nitrided alloys in the vanadium-tungsten-titanium system;
FIG. 6 is a ternary diagram for nitrided alloys in the vanadium-molybdenum-titanium system.

EXPERIMENTAL PROCEDURES

Figure 3:
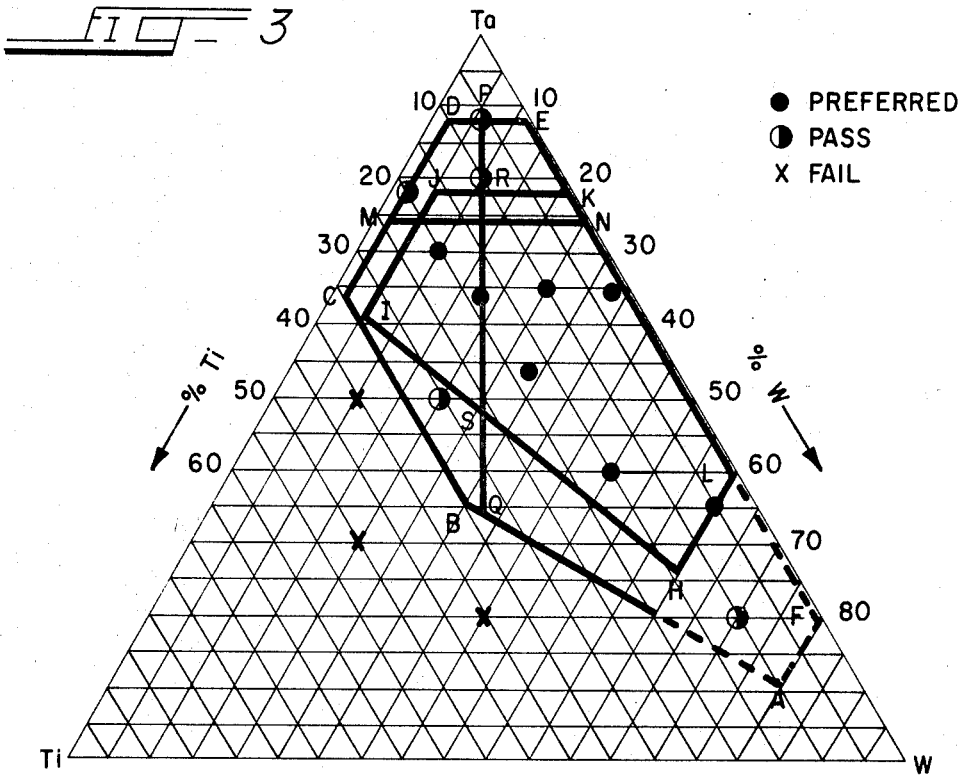
FIG. 3 is a ternary diagram for nitrided alloys in the tantalum-tungsten-titanium system.

Before commencing the detailed discussion of our invention we consider it appropriate to first describe the experimental procedures we employed and the criteria established whereby we determined the utility of the present nitrided materials. Certainly all of this could be written as a series of examples (and should be considered as such) but for purposes of brevity we will present the data in tabular form.

In our experimental work a series of alloys were melted under an argon atmosphere in a non-consumable electrode arc furnace using a water-cooled copper hearth. High purity materials (greater than 99.5%) were used for the alloy charges that generally weighed about 70 grams.

Some of the alloys were directly cold rolled to ⅛ inch thick plate. Several compositions were hot rolled and scalped prior to use. These procedures are of course, quite well known for those skilled in the art.

The processed alloys were cut into specimens approximately ⅜ x ⅜ x ⅛ in. and reacted in molecular nitrogen at atmospheric pressure unless otherwise described. The resulting structure, thickness, and microhardness of the various reaction zones or layers were determined using standard metallographic techniques. A variety of tests were used to evaluate the strength and toughness of these materials for potential use in abrasive wear or metal cutting applications.

The metal cutting tests were performed on tool inserts the same size as the aforesaid specimens having an 0.030" nose radius which was used as a section of the cutting surface. Such radii were ground on the specimens prior to nitriding.

The alloys as thus prepared were subsequently nitrided. For nitriding we used a cold wall furnace employing a molybdenum heating element and radiation shields which furnace was evacuated to 5 microns pressure and flushed with nitrogen prior to heating. Temperatures were measured with an optical pyrometer, namely, a Leeds and Northrup Optical Pyrometer, Catalogue No. 862, sighting on an unnitrided molybdenum heating element which completely surrounded the specimens. Accordingly, all temperatures given herein are optically measured, uncorrected.

Following nitrided sample preparation lathe turning tests were run thereon at surface speeds from 100 to 750 surface feet per minute (s.f.m.) on AISI 4340 steel having a hardness of around Rockwell C (Rc), 43 to 45. A feed rate of 0.005 in./rev. and depth of cut of 0.050 in. were used. A standard negative rake tool holder was employed with a 5° back rake and a 15° side cutting edge angle. Tool wear was measured after removing a given amount of material.

For reasons set out below our principal criterion in determining whether the present nitrided materials pass or fail and thus whether or not they are included or excluded from the scope hereof was the ability to cut a required volume of the 4340 steel at speeds of both 100 and 750 s.f.m. In Table I this includes everything not indicated as failing.

In the experimental discussions of this specification the following conditions apply unless otherwise specified:
 (1) all nitriding was carried out in molecular nitrogen at atmospheric pressure;
 (2) the specimens were of the size as set forth above; and
 (3) initial testing involved the removal of 2 cubic inches of the 4340 steel.

At 750 s.f.m. our high performance, nitrided materials readily pass the initial test of 2 cu. in. metal removal in about 1 minute. (We would note that by "s.f.m." is meant the linear rate at which the material being cut passes the cutter.)

Figure 7:
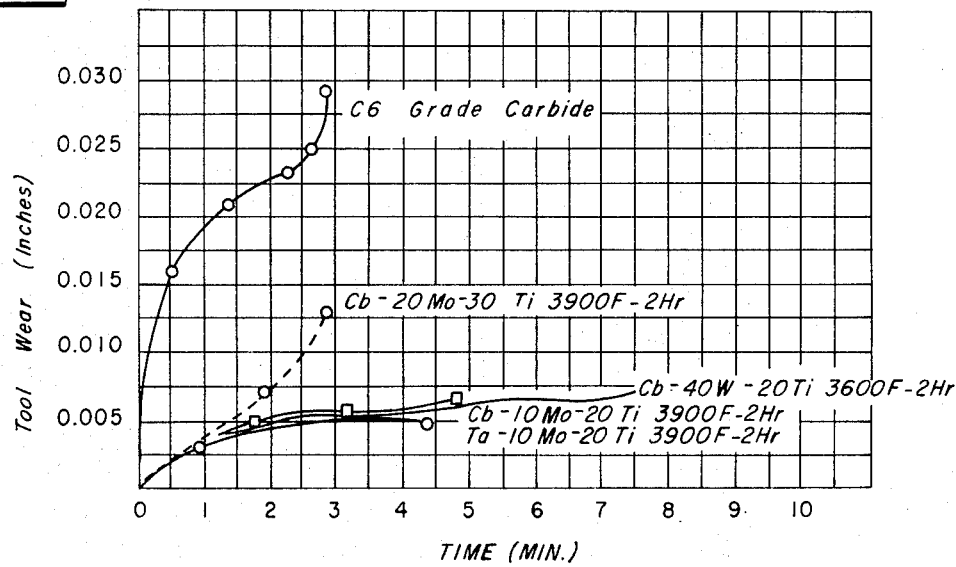
FIG. 7 is a graph comparing tool wear properties of one of the best sintered carbide tool materials with some of those of the present materials.

For a comparison of the typical cutting capability of a few of our materials with one of the best sintered carbides (C6 grade) presently available, reference should be had to FIG. 7. Such graph shows that, at 750 s.f.m. the carbide had more than 0.030 in. tool wear in about 3 minutes whereas one of our nitrided columbium-tungsten-titanium alloys wore much less even after 6 minutes of cutting.

In evaluating tools and tool materials failure is often assumed to occur when the wearland reaches 0.030 inch. With the materials of this invention, as reported in the tabular and graphic data herein presented, we selected a rather severe test—we indicated those which are good (i.e., pass the test) when at 750 s.f.m. and 2 cu. in. removal, there is a uniform wearland of less than 0.025 in. Furthermore, we would note that although chipping is seen in some compositions upon testing at 750 s.f.m. the chipping propensity is aggravated at lower speeds and better assessed at 100 s.f.m. The latter is one of the reasons for selecting both speeds.

Development of an acceptable test criterion at this lower speed requires a somewhat more detailed comment. Materials that cut the required 2 cu. in. for the screening test at the speed with little wear and no chipping obviously pass. Those materials which exhibit gross chipping and high wear of the frontal cutting edge or the nose of the tool we have rated as failing. Furthermore, a number of materials have been shown to satisfactorily cut the 2 cu. in. and have serious nose chipping and our testing has shown that these materials get progressively worse; therefore, such materials are also rated as failures. Other materials will show no chipping or high wear of the cutting edge, but some limited micro-chipping or scoring of the nose occurs as soon as 0.5 cu. in. of metal is removed. However, the toughness of the material is sufficient that this initial accentuated nose wear does not propagate. We have removed 6 cu. in. of metal by cutting and found little further change in cutting edge wear or the accentuated nose wear in some of these materials. We have rated the performance of these as passed or marginal depending upon the amount of the accentuated nose wear.

Table I presents cutting test results of some of our materials and others for the removal of 2 cu. in. of hardened steel at 750 and 100 s.f.m. All of such alloys were nitrided in molecular nitrogen at the temperatures indicated (as measured by the aforesaid Optical Pyrometer) for the times shown.

TABLE I

| Alloy composition, weight percent | Nitriding treatment | | Cutting test results at speed | |
|---|---|---|---|---|
| | ° F. | Hours | 750 s.f.m. | 100 s.f.m. |
| Unalloyed Cb | 3,600 | 2 | F | F |
| Cb-20 Ti | 3,200 | 2 | F | F |
| Cb-20 Ti | 3,600 | 2 | F | F |
| Cb-20 Ti | 3,800 | 2 | F | F |
| Cb-27 Ti | 3,600 | 2 | F | F |
| Cb-27 Ti | 3,800 | 2 | F | F |
| Cb-40 Ti | 3,400 | 2 | F | F |
| Cb-40 Ti | 3,600 | 2 | F | F |
| Cb-60 Ti | 3,400 | 2 | F | F |
| Cb-60 Ti | 3,600 | 2 | F | F |
| Cb-70 Ti | 3,200 | 2 | F | F |
| Cb-70 Ti | 3,400 | 2 | F | F |
| Cb-80 Ti | 3,200 | 2 | F | F |
| Cb-10 W-10 Ti | 3,600 | 2 | P* | P |
| Cb-19 W-5 Ti | 3,600 | 1 | P* | P |
| Cb-20 W-10 Ti | 3,600 | 1 | P* | P* |
| Cb-9 W-20 Ti | 3,600 | 1 | P* | P |
| Cb-9 W-20 Ti | 3,600 | 2 | P* | P |
| Cb-1 W-29 Ti | 3,600 | 1 | P* | P* |
| Cb-18 W-18 Ti | 3,600 | 2 | P* | P* |
| Cb-31 W-15 Ti | 3,600 | 4 | P* | P* |
| Cb-35 W-8 Ti | 3,600 | 2 | P* | P* |
| Cb-38 W-2 Ti | 3,600 | 2 | P | P |
| Cb-20 W-30 Ti | 3,600 | 2 | P* | P* |
| Cb-40 W-20 Ti | 3,900 | 2 | P* | P* |
| Cb-40 W-20 Ti | 3,600 | 2 | P* | P* |
| Cb-50 W-12 Ti | 3,700 | 2.5 | P* | P* |
| Cb-56 W-15 Ti | 3,600 | 4 | P* | P* |
| Cb-40 W-40 Ti | 3,600 | 2 | F | P |
| Cb-20 W-50 Ti | 3,400 | 2 | F | F |
| Cb-20 W-50 Ti | 3,600 | 2 | F | F |
| Cb-70 W-10 Ti | 3,600 | 2 | P | P* |
| Cb-8 Mo-4 Ti | 3,600 | 1 | P(c) | F |
| Cb-16 Mo-5 Ti | 3,600 | 1 | P* | P |
| Cb-27 Mo-3 Ti | 3,600 | 1 | P* | P |
| Cb-10 Mo-10 Ti | 3,600 | 2 | P(c) | P |
| Cb-20 Mo-10 Ti | 3,600 | 2 | P* | P* |
| Cb-30 Mo-10 Ti | 3,600 | 2 | P* | P* |
| Cb-10 Mo-20 Ti | 3,200 | 2 | F | P* |
| Cb-10 Mo-20 Ti | 3,600 | 2 | P* | P* |
| Cb-20 Mo-20 Ti | 3,400 | 6 | P* | P* |
| Cb-20 Mo-20 Ti | 3,600 | 2 | P* | P* |
| Cb-20 Mo-20 Ti | 3,900 | 2 | P* | P |
| Cb-35 Mo-15 Ti | 3,900 | 2 | P* | P* |
| Cb-10 Mo-30 Ti | 3,900 | 2 | P* | P |
| Cb-10 Mo-30 Ti | 3,600 | 2 | P* | P* |
| Cb-20 Mo-30 Ti | 3,200 | 2 | F | P* |
| Cb-20 Mo-30 Ti | 3,400 | 6 | P* | P* |
| Cb-20 Mo-30 Ti | 3,600 | 2 | P* | P* |
| Cb-20 Mo-30 Ti | 3,900 | 2 | P* | F |
| Cb-50 Mo-10 Ti | 3,600 | 2 | P* | P* |
| Cb-1 Mo-39 Ti | 3,600 | 1 | F | F |
| Cb-1 Mo-39 Ti | 3,600 | 2 | P(w) | F |
| Cb-10 Mo-40 Ti | 3,600 | 2 | P | P |
| Cb-7 Mo-35 Ti | 3,600 | 2 | P(c) | P |
| Cb-32 Mo-26 Ti | 3,400 | 4 | P | P* |
| Cb-5 Mo-65 Ti | 3,200 | 2 | F | F |
| Cb-5 Mo-65 Ti | 3,400 | 2 | F | F |

See Notes at end of table.

TABLE I—Continued

| Alloy composition, weight percent | Nitriding treatment °F. | Nitriding treatment Hours | Cutting test results at speed 750 s.f.m. | Cutting test results at speed 100 s.f.m. |
|---|---|---|---|---|
| Cb-10 Mo-60 Ti | 3,200 | 2 | F | F |
| Cb-30 Mo-40 Ti | 3,600 | 2 | F | F |
| Unalloyed Ta | 3,600 | 2 | F | X |
| Ta-5 Ti | 3,600 | 2 | P(c) | F |
| Ta-10 Ti | 3,600 | 2 | P* | F |
| Ta-10 Ti | 3,800 | ½ | P(c) | F |
| Ta-20 Ti | 3,600 | 2 | P* | F |
| Ta-23 Ti | 3,600 | 2 | P* | F |
| Ta-30 Ti | 3,600 | 2 | P* | F |
| Ta-50 Ti | 3,600 | 2 | P(c) | F |
| Ta-70 Ti | 3,400 | 2 | F | F |
| Ta-80 Ti | 3,200 | 2 | F | F |
| Ta-33.5 W-1.5 Ti | 3,600 | 2 | P* | P* |
| Ta-6 W-6 Ti | 3,600 | 1 | P | P |
| Ta-60 W-5 Ti | 3,900 | 2 | P* | P* |
| Ta-10 W-10 Ti | 3,600 | 2 | P(c) | P |
| Ta-25 W-10 Ti | 3,600 | 2 | P* | P* |
| Ta-2 W-20 Ti | 3,600 | 2 | P* | P |
| Ta-10 W-20 Ti | 3,600 | 2 | P* | P* |
| Ta-18 W-18 Ti | 3,600 | 2 | P* | P* |
| Ta-29 W-17 Ti | 3,600 | 2 | P* | P* |
| Ta-45 W-15 Ti | 3,900 | 2 | P* | P* |
| Ta-20 W-30 Ti | 3,600 | 2 | P | F |
| Ta-20 W-30 Ti | 3,900 | 2 | P(w) | P |
| Ta-10 W-40 Ti | 3,900 | 2 | P | F |
| Ta-20 W-50 Ti | 3,600 | 2 | F | F |
| Ta-40 W-40 Ti | 3,200 | 2 | F | X |
| Ta-70 W-10 Ti | 3,600 | 2 | P | P* |
| Ta-10 Mo-5 Ti | 3,600 | 1 | P(c) | P |
| Ta-38 Mo-2 Ti | 3,600 | 2 | P* | P |
| Ta-5 Mo-10 Ti | 3,600 | 1 | P(c) | P |
| Ta-10 Mo-10 Ti | 3,600 | 2 | P* | P |
| Ta-19 Mo-9 Ti | 3,600 | 2 | P* | P* |
| Ta-30 Mo-10 Ti | 3,600 | 2 | P* | P* |
| Ta-22 Mo-17 Ti | 3,900 | 2 | P* | P* |
| Ta-10 Mo-20 Ti | 3,600 | 2 | P* | P* |
| Ta-4.4 Mo-22 Ti | 3,600 | 2 | P* | P |
| Ta-10 Mo-60 Ti | 3,600 | 2 | P | F |
| Ta-20 Mo-30 Ti | 3,900 | 2 | P | P* |
| Ta-10 Mo-40 Ti | 3,600 | 2 | P* | P* |
| Ta-5 Mo-45 Ti | 3,600 | 2 | F | F |
| Ta-20 Mo-50 Ti | 3,600 | 2 | F | F |
| Unalloyed V | 3,200 | 2 | X | F |
| V-20 Ti | 3,200 | 2 | X | F |
| V-40 Ti | 3,200 | 2 | X | F |
| V-50 Ti | 2,800 | 2 | F | F |
| V-50 Ti | 2,600 | 2 | F | F |
| V-10 Mo-10 Ti | 2,800 | 2 | P* | P |
| V-25 Mo-10 Ti | 2,800 | 2 | P* | P* |
| V-25 Mo-10 Ti | 3,000 | 2 | P* | P* |
| V-17 Mo-17 Ti | 2,800 | 2 | P* | P* |
| V-17 Mo-17 Ti | 3,000 | 2 | P* | P |
| V-2 Mo-33 Ti | 2,800 | 2 | P | P |
| V-10 Mo-30 Ti | 2,800 | 2 | F | P* |
| V-10 Mo-50 Ti | 3,200 | 2 | P | F |
| V-10 Mo-30 Ti | 2,800 | 4 | P* | F |
| V-10 Mo-30 Ti | 3,000 | 2 | F | P |
| V-10 Mo-27 Ti | 2,800 | 2 | F | P* |
| V-10 Mo-27 Ti | 2,800 | 6 | F | P* |
| V-10 Mo-27 Ti | 3,000 | 2 | P* | P |
| V-10 Mo-27 Ti | 3,000 | 4 | P* | F |
| V-17 Mo-28 Ti | 3,000 | 2 | P* | P* |
| V-20 Mo-24 Ti | 3,000 | 2 | P* | P* |
| V-30 Mo-20 Ti | 2,800 | 4 | P* | P* |
| V-30 Mo-20 Ti | 3,000 | 2 | P* | P* |
| V-30 Mo-20 Ti | 3,200 | 2 | P* | P* |
| V-45 Mo-15 Ti | 3,000 | 2 | P | P* |
| V-45 No-15 Ti | 3,000 | 4 | P* | P* |
| V-5 Mo-47.5 Ti | 2,600 | 4 | P | P |
| V-5 Mo-47.5 Ti | 2,600 | 8 | F | P |
| V-5 Mo-47.5 Ti | 3,000 | 2 | P | F |
| V-10 Mo-45 Ti | 2,800 | 2 | F | F |
| V-10 Mo-45 Ti | 3,000 | 4 | P* | P |
| V-30 Mo-35 Ti | 3,200 | 4 | P* | P |
| V-72 Mo-8 Ti | 3,200 | 2 | F | F |
| V-72 Mo-8 Ti | 3,400 | 2 | F | F |
| V-15 Mo-55 Ti | 3,200 | 2 | F | X |
| V-15 Mo-55 Ti | 3,200 | 4 | F | X |
| V-10 W-10 Ti | 2,800 | 2 | P* | P* |
| V-20 W-15 Ti | 2,600 | 4 | P* | P* |
| V-20 W-15 Ti | 2,600 | 8 | P* | P* |
| V-20 W-15 Ti | 3,000 | 2 | P* | P* |
| V-42 W-4.5 Ti | 3,000 | 2 | P* | P* |
| V-42 W-4.5 Ti | 3,000 | 4 | P* | X |
| V-20 W-24 Ti | 3,000 | 2 | P* | P* |
| V-10 W-36 Ti | 2,600 | 8 | P | P* |
| V-10 W-36 Ti | 3,000 | 2 | P* | P* |
| V-1 W-40 Ti | 2,800 | 2 | F | P* |
| V-10 W-54 Ti | 3,200 | 2 | F | F |
| V-40 W-36 Ti | 3,200 | 2 | P* | P |
| V-20 W-40 Ti | 3,200 | 2 | P* | P |
| V-35 W-20 Ti | 2,800 | 2 | P* | P* |
| V-35 W-20 Ti | 3,000 | 2 | P* | X |
| V-40 W-24 Ti | 2,800 | 2 | P* | P* |
| V-40 W-24 Ti | 3,000 | 2 | P* | X |
| V-50 W-10 Ti | 3,000 | 2 | P* | P* |
| V-50 W-10 Ti | 3,000 | 4 | P* | P* |
| V-60 W-15 Ti | 2,800 | 2 | P* | P* |
| V-75 W-5 Ti | 3,200 | 2 | P | P* |

NOTES:
P*=pass, preferred.
P=pass.
F=fail.
(c)=chipped.
(w)=wear.
X=not tested.

Although the foregoing examples are directed to the reaction of various alloy compositions in molecular nitrogen at atmospheric pressure sources of nitrogen other than the diatomic gas may be employed to produce the present nitrided composite materials or the nitrogen may be present as a relatively minor constituent in a gaseous mixture. For example, we nitrided test specimens of Cb-20 W-30 Ti at 3600° F. for 2 hours in both argon-5% nitrogen and argon-2½% nitrogen with a resulting nitrogen pick up of 18 and 20 mg./cm.$^2$ respectively compared to 18 mg./cm.$^2$ for like material similarly treated in 100% nitrogen. In all instances useful cutting tools were produced.

Furthermore, heat treating variables may be employed to alter nitriding reaction kinetics and to modify the reaction product. We have found that the use of certain heating and cooling rates, multiple heat treatments in nitrogen and post nitriding treatments may produce certain improvements in the present materials. For example, when Cb-20 W-30 Ti nitrided at 3900° F. for 2 hours was subsequently annealed in argon for 1 hour there was improvement in chipping resistance upon testing at 100 s.f.m.

DESCRIPTION OF THE INVENTION AND DISCUSSION OF THE PREFERRED EMBODIMENTS

We next wish to turn to additional disclosure and discussion of the various nitrided compositions falling within the teachings hereof and of the general concepts underlying our invention.

We would first note that because of the wide variations in alloy compositions, within certain limits as hereinafter set forth, nitriding at different temperatures and times is required to develop the present high performance materials. In general, microhardness, metallography, hardness and weight gain are employed to guide the selection of useful nitriding treatments.

Furthermore, in order to produce useful, nitrided composite materials of the present alloy systems we find that the nitrogen pick-up must be at least 1 mg./cm.$^2$ of surface area, although an even higher amount is preferred, the surface microhardness should be more than 1000 diamond pyramid numerals (DPN) and the reaction depth to which such hardness is developed is at least 0.5 mil.

Another important aspect to consider in understanding our invention relates to the relative nitrideability of the metallic constituents of our various alloy systems. Such background must be taken in consideration in order to intelligently practice the teachings of our invention. Thus, in terms of nitride reaction with the metals used herein molybdenum and tungsten are relatively inert, columbium, tantalum or vanadium readily nitride and titanium is the most reactive with nitrogen. Upon nitriding we find a partitioning of nitrogen depending upon the reactivity of the substrate matter. Because of this and as shown in our experimental results the amounts of titanium used should be limited, as compared with the other constituents and furthermore if the molybdenum or tungsten content is increased the nitriding reaction in general proportionately decreases.

Thus, it should be borne in mind in considering the present invention and experimental results recited herein that the required nitriding temperatures and times are related to the composition being treated. This specification presents considerable data as to these variables but we would note that the general principles of the invention should be taken into consideration in nitriding compositions falling within the scope hereof but not shown as an example herein.

Another feature to consider is that in the present alloy systems relatively large amounts of columbium, tantalum and/or vanadium, and to a somewhat lesser extent titanium, and tungsten and/or molybdenum may be used while retaining good performance. This becomes important commercially, we believe since many such alloys can readily be cold fabricated to the desired shape and then nitrided.

Still another, but related feature of the present alloy system is the fact that the original shape of a machined part is retained during the high temperature nitriding. When treated as herein taught dimensional growth of less than 1 percent is usually obtained; however, in many of our compositions this growth is significantly less and in a number of compositions we have noted a slight shrinkage. Thus, the nitriding of the present materials can be based upon achieving desired properties rather than minimizing the reaction to avoid possible piece distortion.

Many of our compositions can be nitrided to form the composite structure throughout thus forming a more homogenous, but still graded, composite with good toughness. However, the reaction can generally be limited to the outer region without much hardening of the core or substrate. The minimum reaction depth depends upon the intended use, but it has been shown that the amount of reaction required for severe applications such as the cutting test described herein is quite small.

The thickness of the alloy body will also influence nitriding kinetics and the amount of nitrogen absorption required to develop adequate hardness and grading for useful abrasion resistance and metal cutting capability. As the alloy becomes thinner effective hardening can be accomplished at lower nitriding temperature or shorter time. This will apply whether the material is a free standing body or a clad or coating on another substrate.

As an example of this effect, the alloy Cb-30 Ti-20 W, must be nitrided at 3600° F. for 2 hours to develop a surface hardness of 1175 DPN at a depth of one mil when the specimen thickness is 0.125 inch. If the specimen thickness is 0.0065 inch the same hardness can be obtained at one mil by nitriding at 3200° F. for 1¼ hour. The nitrogen pick-up of these 0.125 and 0.0065 inch thick samples was 18 and 5.6 mg./cm.$^2$, respectively.

The amount of nitrogen absorption required to obtain high performance is strongly dependent upon alloy composition as well as sample thickness. For example, all of the following alloys and treatments resulted in preferred cutting performance as ⅜ x ⅜ x ⅛ inch samples.

| | Nitriding treatment | | Weight change, mg./cm.$^2$ |
|---|---|---|---|
| | ° F. | Hours | |
| Composition: | | | |
| Cb-20 W-30 Ti | 3,600 | 2 | 18 |
| V-25 Mo-10 Ti | 2,800 | 2 | 8.3 |
| Ta-33.5 W-1.5 Ti | 3,600 | 2 | 5 |
| Ta-60 W-5 Ti | 3,900 | 2 | 3.7 |

If the alloys requiring less nitrogen pick-up are employed as thin specimens, the required nitrogen absorption would be significantly reduced as was shown for Cb-20 W-30 Ti.

In all of the ternary phase diagrams appended as figures hereto the legend of "Preferred," "Pass" and "Fail" is applied. We wish to point out what is meant by this.

"Preferred," denoted by the solid black circles, means the test sample cuts at both 750 and 100 s.f.m. with little wear.

"Pass," denoted by the half-blackened circles, means the test sample cuts at both speeds but higher wear is noted at one speed. In most cases, this higher wear is observed at 100 s.f.m. and is caused by micro-chipping.

"Fail," denoted by X, means the test sample fails by high wear at either 750 or 100 s.f.m. These materials are excluded from the scope of our invention.

We turn next to some of the specific alloy systems falling within the scope hereof.

COLUMBIUM-TUNGSTEN-TITANIUM SYSTEM

A number of ternary alloys of the system Cb-W-Ti were reacted with nitrogen at elevated temperatures. The treatment conditions and cutting test results are set forth in Table I and the cutting test results are graphically shown in FIG. 1.

Compositions falling within the boundaries of the polygon formed by lines ABCDEFA of FIG. 1 cover all of our columbium-tungsten-titanium nitrided materials which pass the criteria set forth above, satisfactory cutting at both 750 and 100 s.f.m., and also our preferred materials which pass these tests with very low wear.

From FIG. 1 it can be seen that in such nitrided ternary system the following compositional ranges are useful:

From:
   10% to 85% columbium
   1% to 45% titanium, and
   2% to 80% tungsten and wherein the columbium to titanium ratio is more than 1:1.

Within such broad range of useful materials we find that the following compositions are especially useful as cutting tool materials when subjected to appropriate nitriding treatment:

From:
   24% to 75% columbium
   3% to 36% titanium
   10% to 60% tungsten and wherein the columbium to titanium ratio is greater than 1.5:1.

Such preferred range of Cb-Ti-W alloys for cutting tools is illustrated in the inner polygon formed of lines HIJKLH in FIG. 1 and it should be noted that within such polygon all of the nitrided materials are preferred as regards the 100 and 750 s.f.m. criterion set out herein when nitrided as herein taught.

The alloy Cb-32 W-15 Ti represents one of the preferred ternary compositions that can be nitrided to develop the type of useful composite material of our invention. When nitrided at 3600° F. for four hours there is developed a multiphase structure—that is, a structure consisting of two or more phases, usually differing in nitrogen content as well as metallic content, which are discernible when observed in cross-section under a microscope using typical metallographic techniques. Since the unreacted alloys are generally single phase, the nitrided metallographically-observed reaction depth of the multiphase structure is readily seen. Of course, some hardening can occur even below the metallographically observed reaction zone. In this Cb-31 W-15 Ti sample, the reaction zone is 30 mils deep.

We would also note, to avoid any misunderstanding that the term "phase" as used herein means a physically homogeneous and distinct portion of a materials system and that "multiphase" means two or more of such phases.

Upon such treatment the Cb-31 W-15 Ti sample has a high surface hardness which grades to a reasonable depth.

Tool inserts prepared from Cb-31 W-15 Ti, treated as noted above, gave the following cutting test results on the 4340 steel test piece at 750 s.f.m.:

| Vol. of material removed (cubic inches): | Tool wear (inches) |
|---|---|
| 2.05 | 0.006 |
| 4.25 | 0.007 |
| 6.60 | 0.008 |

This, of course, is a very low rate for this test condition. One of the best grades of sintered tungsten carbide (C6)[1] is totally worn and unsuitable for further cutting after removing this amount of material at this speed.

Cutting tests were also run at 100 s.f.m. After removing 2.0 cu. in. of material the tool showed only 0.005 in. of uniform nose wear and there was no evidence of chipping.

If the alloy composition is modified by substituting additional tungsten for columbium, while maintaining the

---

[1] As defined in "Metals Handbook," 8th ed. vol. 1, p. 660 (1961).

titanium content at 15% we found that similarly useful composites are produced upon subsequent nitriding. Thus an alloy of composition Cb-56 W-15 Ti, nitrided for four hours at 3600° F., shows useful cutting properties at both 750 and 100 s.f.m.

The titanium content of the nitrided alloy can be increased to some extent and useful composites can still be produced. For example, as shown in Table I alloys of the compositions Cb-40 W-20 Ti and Cb-20 W-30 Ti have been successfully nitrided to produce useful cutting tools.

We find that when the alloy Cb-20 W-30 Ti is nitrided, useful high speed cutting performance can be obtained when sufficient weight gain and depth of reaction are attained. Kinetic data for a ⅜ x ⅜ x ⅛ in. specimen of this alloy nitrided at a variety of temperatures are as follows:

| | Time, hrs. | Weight gain, mg./cm.$^2$ | Metallo-graphically-observed reaction depth, mils |
|---|---|---|---|
| Optical temperature, °F.: | | | |
| 3,400 | 2 | 12.7 | 20 |
| 3,600 | 2 | 18 | 30 |
| 3,600 | 4 | 25 | 40 |
| 3,800 | 2 | 27 | 45 |
| 3,900 | 2 | 40 | 60 |

When reacted at 3400° F. the tool produced will not cut the test steel satisfactorily at either high or low speeds. When reacted at 3600° F. for 2 hours however this alloy will cut steel at 750 s.f.m. showing a uniform nose wear of 0.004 in. after removing 2 cu. in. and at the 100 s.f.m. cutting speed the tool shows improvement in the low speed cutting capability. When the alloy is reacted for 2 hours at temperatures substantially above 3600° F. the cutters show low uniform wear at 750 s.f.m. but there is a pronounced tendency toward chipping, or notching, particularly along the leading edge. This brittle behavior becomes very pronounced in the low speed cutting tests. When this composition is nitrided at 3800° or 3900° F. the tools show severe nose chipping and fail rapidly when cutting at low speeds.

Thus the behavior of this alloy is quite sensitive to the amount of nitriding, but certainly the composition can be treated to cut in a satisfactory manner.

For higher tungsten containing materials, we find there is much greater latitude in nitriding conditions, temperature and time, over which useful composites can be made. This feature is important, not only in terms of process control, but in the capability of using these present materials for a wide variety of different metal cutting operations and for wear and abrasion resistant use in addition to metal cutting. Our work has shown that, from the composition (i.e., Cb-20 W-30 Ti), if the tungsten content is decreased, beneath a certain level, or the titanium level increased, the behavior of the resulting nitrided composites becomes progressively worse.

Thus, for example, the composition Cb-50 Ti-20 W, when nitrided at either 3400° F. or 3600° F., will not cut the test steel at either high or low speeds. This result is expected since there is more titanium than columbium in this alloy.

The composition Cb-29 Ti-1 W when nitrided at 3600° F. for 1 hour will cut satisfactorily at 750 s.f.m. but fails by chipping when tested at 100 s.f.m. At least 2% tungsten must be present.

Whereas some minimum nitriding is necessary to achieve the useful combination of properties in the alloy Cb-40 W-20 Ti, we find that this alloy can be very heavily nitrided and tools so produced still retain their ability to cut effectively at both low and high speeds. Tools produced by nitriding at both 3600° F. and 3900° F. show excellent cutting capability and low wear when run at 750 s.f.m. and show no localized failure, or brittleness, when tested at 100 s.f.m. The following data were obtained for such Cb-40 W-20 Ti material:

| | Reaction depth, mils | Uniform tool wear (in) 100 s.f.m. | At speed (s.f.m.) 750 s.f.m. |
|---|---|---|---|
| Nitriding treatment: | | | |
| 3,600° F., 2 hrs | 15 | [1] 0.004 | [2] 0.005 |
| 3,900° F., 4 hrs | 60 | [1] 0.003 | [3] 0.008 |

[1] 2.0 cu. in.
[2] 3.8 cu. in.
[3] 12.6 cu. in.

Thus, for this composition while there is a pronounced difference in the extent of reaction, in either condition the material shows the desirable wide range cutting capability. The significant difference in properties of these cutting tools can be further appreciated by comparing hardness traverses made on the two materials.

| | Microhardness (DPN, 200 g. load) | |
|---|---|---|
| | Nitrided 3,600° F. 2 hrs. | Nitrided 3,900° F. 4 hrs. |
| Distance from surface, mils: | | |
| 0.5 | 1,380 | 2,000 |
| 1 | 1,360 | 1,500 |
| 2 | 830 | 1,210 |
| 4 | 860 | 1,150 |
| 8 | 600 | 890 |

Thus, the alloy nitrided for 2 hrs. at 3600° F. has a moderate hardness—similar to that of sintered tungsten carbide tools—extending to a depth of less than 2 mils from the surface while the material nitrided at the higher temperatures has much higher hardness extending to a greater depth. It is of considerable significance that this wide variation in hardness grading can be tolerated in this composition while maintaining wide range cutting capability.

For columbium rich materials a minimum amount of both tungsten and titanium are required in order to produce satisfactory nitride composites. The alloy Cb-10 W-10 Ti can be nitrided to produce composites capable of cutting effectively at 750 s.f.m.; however, this material does not show optimum performance at 100 s.f.m. and because of this and because of the relatively high columbium, it is not considered one of our preferred materials.

The alloy Cb-30 W-8 Ti when nitrided at 3600° F., for 2 hours shows effective cutting capability at both high and low speeds. If the titanium content is reduced to lower levels, i.e., Cb-38 W-2 Ti the cutting capability at both 750 and 100 s.f.m. becomes somewhat reduced.

The alloys that fall within our preferred composition ranges can be nitrided to produce materials of high wear resistance, and in cutting tools, materials that are highly resistant to cratering. Cratering can lead to rapid failure of tools when tested under severe conditions, i.e., high speed and loads. The cratering resistance in the present materials can be achieved by alloy selection and by greater nitriding to produce higher strength surface layers.

In nitriding the materials of this Cb-W-Ti system we find that nitriding at 3600° F. for 2 hours in the case of our preferred materials and those with higher tungsten content produces excellent cutting tools. For columbium rich alloys or those with relatively low tungsten generally lower nitriding temperatures and/or shorter times are indicated.

COLUMBIUM-MOLYBDENUM-TITANIUM SYSTEM

The system Cb-Mo-Ti upon nitriding as herein taught is quite comparable to the system Cb-W-Ti with the principal differences being that in the former the columbium range is slightly smaller (20% to 85% as compared with 10% to 85%) and the maximum useful amount of molybdenum is somewhat less than that of tungsten (60% Mo as compared with 80% W). Except for these slight compositional differences the two alloy systems for purposes of this invention are essentially the same, as are all of the systems disclosed herein, and the resulting properties and capability of meeting our test criteria for utility are comparable. In fact, as is set out below within certain compositional limits the tungsten and molybdenum contents are substitutable one for the other or both said metals may be included in the same base alloy. Various examples of this alloy system with nitriding temperatures and times are presented in Table I and the cutting test results are graphically shown in FIG. 2.

Compositions falling within the boundary of the polygon formed by lines ABCDEFA of FIG. 2 cover all of our columbium-molybdenum-titanium nitrided materials which pass the criteria set forth above, satisfactory cutting at both 750 and 100 s.f.m., and also our preferred materials which pass these tests in the very low wear.

From FIG. 2 it can be seen that in such nitrided ternary system the following compositional ranges are useful:

From:
   20% to 85% columbium
   1% to 45% titanium
   2% to 60% molybdenum and wherein the columbium to titanium ratio is greater than 1:1.

Within such broad range of useful materials we find that the following compositions are preferred as cutting tool materials at 100 and 750 s.f.m. when nitrided as herein taught:

From:
   25% to 75% columbium
   4% to 35% titanium
   8% to 60% molybdenum and wherein the columbium to titanium ratio is greater than 1.6:1.

Such preferred range of Cb-Ti-Mo alloys for cutting tools is illustrated in the inner polygon formed by lines HIJKLH in FIG. 2 and it should be noted that within such polygon all of the nitrided materials are preferred as regards the 100 and 750 s.f.m. criterion set out herein when nitrided as herein taught.

Within such compositional ranges we would note that for one particular study we started with the alloy Cb-20 Mo-30 Ti nitrided at 3600° F. for 2 hours to form a multiphase nitrided composite and determined that when it was used as a tool for cutting the test steel it passed both the 100 and 750 s.f.m. criteria previously established. We then prepared and nitrided two alloys having substantially the same columbium to titanium ratio as the Cb-20 Mo-30 Ti namely:

58 Cb-7 Mo-35 Ti, 3600° F. for 2 hrs.
60 Cb-0 Mo-40 Ti, 3600° F. for 2 hrs.

We found that when the molybdenum content is decreased to 7% the material retains a high speed cutting (750 s.f.m.) capability although some minor chipping was noted. Such chipping becomes more evident at 100 s.f.m. indicating that toughness of the material has been reduced, although the material is still satisfactory, in comparison with the nitrided Cb-20 Mo-30 Ti nitrided for the same time and temperature. In the second alloy, having no molybdenum, we find that the alloy will not cut effectively at either speed. Additional examples of the nitrided binary columbium-titanium showing uniform cutting failure are given in Table I. Such alloys range from pure columbium to columbium—80% titanium nitrided for 2 hours at temperatures ranging from 3200° F. to 3800° F. From these data it should be apparent to those skilled in this art that the presence of molybdenum and/or tungsten is critical in making useful nitrided alloys having as their other principal constituents columbium and titanium.

Such results showing the required use of molybdenum and/or tungsten in the Cb-Ti system can be related to the micro-hardness grading in our composite nitrided structures. As noted above we believe that one of the important features of our useful materials is that they combine a high effective surface hardness with an adequate grading of such hardness down into the body of the composite.

Figure 8:
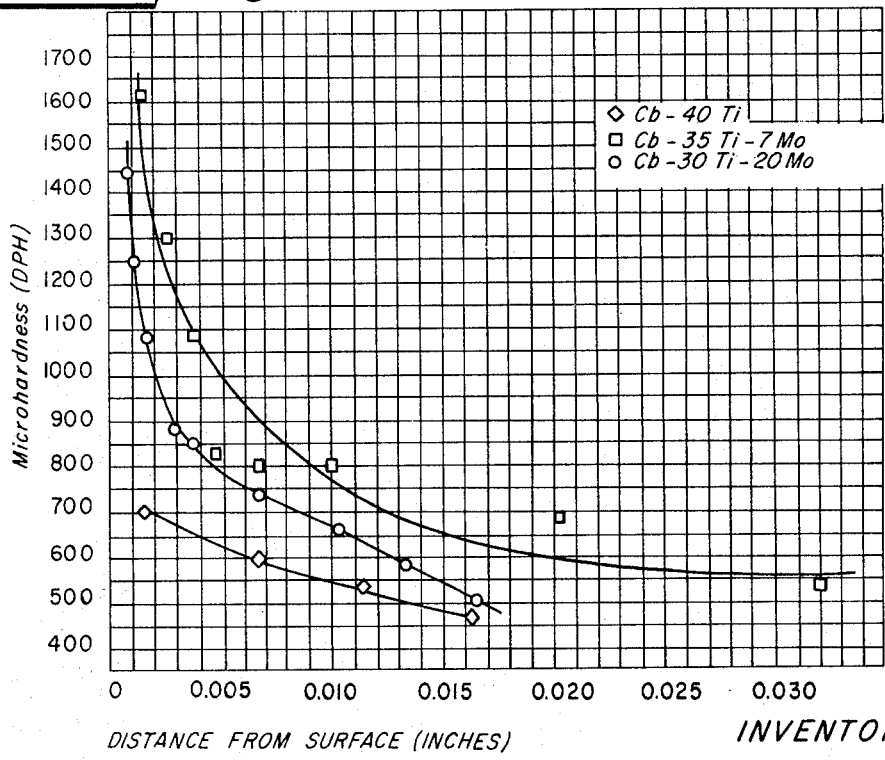
FIG. 8 is a microhardness traverse for several nitrided alloys in the Cb-Mo-Ti system.

Along these lines reference should next be had to FIG. 8 which is a graph of microhardness traverses in a few nitrided composites of the system Cb-Mo-Ti nitrided at 3600° F. for 2 hours. From this graph it may be seen that the most useful material of the three illustrated Cb-20 Mo-30 Ti has a high surface hardness (greater than 1500 DPN) which grades continuously into the substrate. The alloy Cb-7 Mo-35 Ti illustrates a similarly high surface hardness, and a somewhat comparable curve slope again indicating that there is this desired grading of hardness inwardly. When only the binary (60 Cb-40 Ti) is used it is evident from the chart that there is low hardness below the one mil outer layer. Although this outer layer has very high hardness and there is an abrupt discontinuity the hardness of the outer layer could not be measured because of its brittleness.

In the alloys among the Cb-Mo-Ti system we would note that we obtained especially good cutting test results with the following nitrided composites:

60 Cb-10 Mo-30 Ti, 3600° F. for 2 hrs.
60 Cb-20 Mo-20 Ti, 3600° F. for 2 hrs.
60 Cb-30 Mo-10 Ti, 3600° F. for 2 hrs.
70 Cb-20 Mo-10 Ti, 3600° F. for 2 hrs.
70 Cb-10 Mo-20 Ti, 3600° F. for 2 hrs.
50 Cb-20 Mo-30 Ti, 3600° F. for 2 hrs.
40 Cb-50 Mo-10 Ti, 3600° F. for 2 hrs.

Thus, in nitriding the materials of this Cb-Mo-Ti system we find that nitriding at 3600° F. for 2 hours in the case of our preferred materials produces excellent cutting tools. For columbium rich alloys or those with relatively low molybdenum generally lower nitriding temperatures and/or shorter times are indicated.

TANTALUM-TUNGSTEN-TITANIUM SYSTEM

Various examples of this alloy system with nitriding temperatures and times are presented in Table I and the cutting test results thereof are graphically shown in FIG. 3.

As in the alloy systems previously described compositions falling within the boundary of the polygon formed by lines ABCDEFA of FIG. 3 cover all of our tantalum-tungsten-titanium nitrided materials which pass the criteria set forth above, satisfactory cutting at both 750 and 100 s.f.m., and also our preferred materials which pass these tests with very low wear.

From FIG. 3 it can be seen that in such nitrided ternary system the following compositional ranges are useful as herein described:

From:
   10% to 88% tantalum
   1% to 35% titanium
   2% to 80% tungsten wherein the ratio of tantalum to titanium is greater than 1:1.

Within such broad range of useful materials we find that the compositions falling within the following preferred range are especially useful as cutting tool materials when subjected to proper nitriding treatment as herein taught:

From:
   26% to 77% tantalum
   1% to 34% titanium
   5% to 60% tungsten and wherein the ratio of tantalum to titanium is greater than 1.8:1.

Such preferred range of Ta-Ti-W alloys for cutting tools is illustrated in the inner polygon formed by lines HIJKLH in FIG. 3 and it should be noted that within such polygon all of the nitrided materials are preferred as regards the 100 and 750 s.f.m. criterion set out herein when nitrided as herein taught.

Although this alloy system, nitrided, is clearly set forth and described in Table I and FIG. 3 we would like to note a few general observations pertinent thereto.

First of all, it is seen that such materials which cut the test steel very effectively at both 100 and 750 s.f.m. can readily be produced in nitrided composites containing large amounts of tantalum and/or tungsten. At the same time we find that the addition of as little as 2% tungsten to Ta-20 Ti produces a marked increase in wear and chipping resistance at both high and low speeds when compared with the Ta-Ti binary.

To appreciate the importance of the tungsten addition (or the molybdenum addition on the ternary system described below) reference should be had once more to Table I. Binary compositions consisting of tantalum and from 5% to 80% titanium were nitrided for times of between ½ and 2 hours at temperatures ranging from 3200° F. to 3800° F. All failed our test criteria.

In comparison, a 2% addition of tungsten permitted the alloy to pass and at the 10% tungsten level the ternary alloys become quite good.

We wish to again point out another critical feature which is set forth in the present specification and claims, viz., that the tantalum to titanium ratio, just as in the columbium ternary species hereof, must exceed one if a useful composite is to be produced. In Table I we see that the alloy Ta-20 W-50 Ti nitrided at 3600° F. for 2 hours failed at both 100 and 750 s.f.m.

We would also point out that the following alloys, nitrided at 3600° F. for 2 hours illustrate excellent cutting properties under our test conditions:

Ta-25 W-10 Ti
Ta-10 W-20 Ti
Ta-18 W-18 Ti
Ta-29 W-17 Ti

Thus, in nitriding the materials of this Ta-W-Ti alloy system, we find that nitriding at 3600° F. for 2 hours in the case of our preferred materials and those with higher tungsten content produces excellent cutting tools. For tantalum rich alloys or those with relatively low tungsten generally lower nitriding temperatures and/or shorter times are indicated.

TANTALUM-MOLYBDENUM-TITANIUM SYSTEM

This alloy system, when nitrided, is comparable in utility to the tantalum-tungsten-titanium previously described and as is the case in the columbium containing ternaries all or part of the tungsten may be replaced by molybdenum to achieve substantially the same result. The only compositional difference is that while tungsten in this system can range up to 80%, the upper molybdenum limit is 50%.

Figure 4:
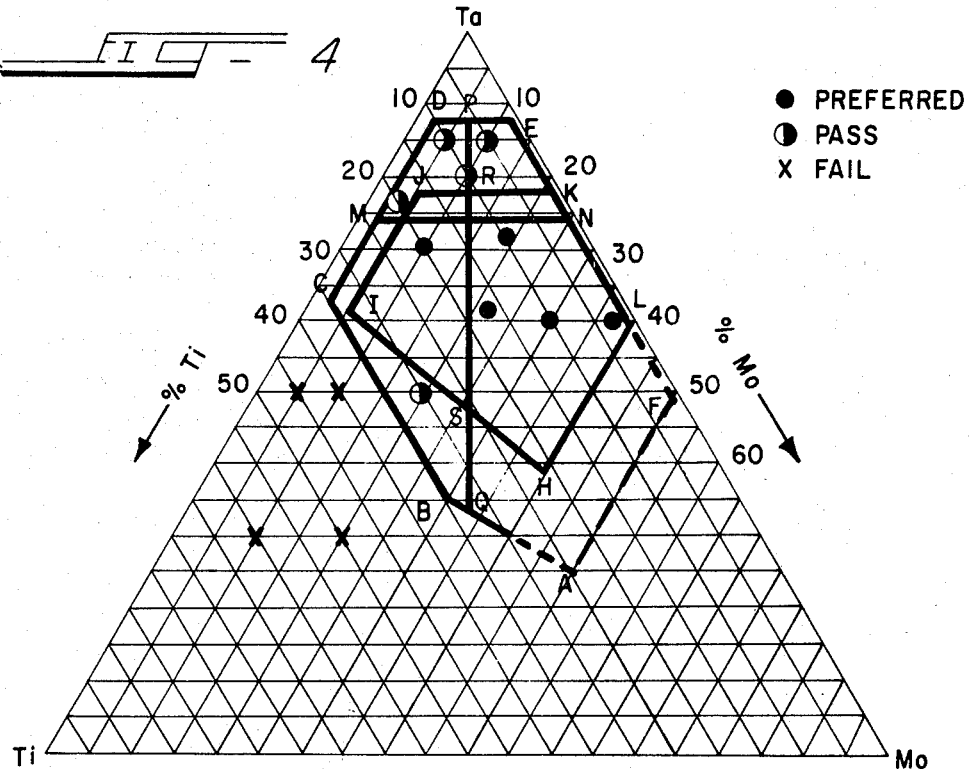
FIG. 4 is a ternary diagram for nitrided alloys in the tantalum-molybdenum-titanium system.

Various examples of this Ta-Mo-Ti alloy system with nitriding temperatures and times are presented in Table I and the cutting test results are graphically shown in FIG. 4.

As in the alloy systems previously described, compositions falling within the boundary of the polygon formed by lines ABCDEFA of FIG. 4 cover all of our tantalum-molybdenum-titanium nitrided materials which pass the criteria set forth above, satisfactory cutting at both 750 and 100 s.f.m., and also our preferred materials which pass these tests with every low wear.

From FIG. 4 it can be seen that in such nitrided ternary system the following compositional ranges are useful:

From:
    25% to 88% tantalum
    1% to 35% titanium
    2% to 50% molybdenum and wherein the ratio of tantalum to titanium is greater than 1:1.

Within such broad range of useful materials we find that the compositions falling within the following preferred range are especially useful as cutting tool materials when subjected to nitriding treatment as herein taught:

From:
    39% to 78% tantalum
    1% to 34% titanium
    5% to 40% molybdenum and wherein the tantalum to titanium ratio is greater than 1.8:1.

Such preferred range of Ta-Mo-Ti alloys for cutting tools is illustrated in the inner polygon formed by lines HIJKLH in FIG. 4 and it should be noted that within such polygon all of the nitrided materials are preferred as regards the 100 and 750 s.f.m. criterion set out herein when nitrided as herein taught.

Of these tantalum-molybdenum-titanium alloys particularly good cutting test results have been achieved with the following composites nitrided at 3600° F. for 2 hours:

Ta-19 Mo-9 Ti
Ta-30 Mo-10 Ti
Ta-10 Mo-20 Ti

Accordingly, in nitriding the materials of this Ta-Mo-Ti system we find that nitriding at 3600° F. for 2 hours in the case of our preferred materials produces excellent cutting tools. For tantalum rich alloys or those with relatively low molybdenum generally lower nitriding temperatures and/or shorter times are indicated.

While the more highly alloyed systems falling within the scope hereof are set forth in greater detail below we would note at this point that except for relatively minor compositional range differences at the range extremes the foregoing clearly shows considerable substitutional possibilities among the metals considered in the aforerecited ternary species. Within a broad composition range molybdenum may be replaced completely or in part by tungsten or the tungsten by molybdenum. Likewise, tantalum may be replaced completely or in part by columbium or columbium by tantalum. The presence of titanium is important and as noted above up to 3% of the titanium content may be replaced by zirconium.

VANADIUM-MOLYBDENUM-TITANIUM SYSTEM

Various examples of this V-Mo-Ti alloy system with nitriding temperatures and times are presented in Table I and the cutting test results are graphically shown in FIG. 6.

As in the alloy system previously described, compositions falling within the boundary of the polygon formed by lines ABCDEFA of FIG. 6 cover all of our vanadium-molybdenum-titanium nitrided materials which pass the criteria set forth above, satisfactory cutting at both 750 and 100 s.f.m., and also our preferred materials which pass these tests with very low wear.

From FIG. 6 it can be seen that in such nitrided ternary system the following compositional ranges are useful:

From:
    15% to 90% vanadium
    1% to 45% titanium
    2% to 60% molybdenum and wherein the vanadium to titanium ratio is greater than 0.66:1.

Within such broad range of useful materials we find that the compositions falling within the following preferred range are especially useful as cutting tool materials when subjected to nitriding treatment as herein taught:

From:
   24% to 78% vanadium
   1% to 35% titanium
   11% to 60% molybdenum and wherein the vanadium to titanium ratio is greater than 1.5:1.

Such preferred range of V-Mo-Ti alloys for cutting tools is illustrated in the inner polygon formed by lines HIJKFH in FIG. 6 and it should be noted that within such polygon all of the nitrided materials are preferred as regards the 100 and 750 s.f.m. criterion set out herein when properly nitrided.

Within such compositional ranges aforesaid we find that the alloy V-25 Mo-10 Ti represents one of the best composites when nitrided at 2800° F. for 2 hours. Such composite machined the hardened test steel effectively at both 100 and 750 s.f.m. and the following tool wear data were obtained:

| Vol. of material removed (in.³) | Tool wear (in.) at 100 s.f.m. | Vol. of material removed (in.³) | Tool wear (in.) at 750 s.f.m. |
| --- | --- | --- | --- |
| 0.51 | 0.008 | 1.36 | 0.005 |
| 0.84 | 0.012 | 2.72 | 0.006 |
| 1.50 | 0.016 | 4.08 | 0.008 |
| 1.83 | 0.019 | | |
| 2.16 | 0.021 | | |

All wear was uniform and no evidence of localized chipping was observed at the tool nose or leading edge. When nitrided for 4 hours at 2800° F. substantially the same results are found.

In this alloy system we find that vanadium content may vary over a broad range and useful cutting tools can be made from nitrided composites so long as due consideration is given to maintaining an appropriate titanium to molybdenum ratio in the alloy. Generally speaking as seen in FIG. 6 as the Ti/Mo ratio is decreased the nitrided materials show enhanced toughness and furthermore we find that they can be nitrided over a wide range of temperatures to cut the hardened test steel at both the high and low test speeds. When the molybdenum content of the present V-Mo-Ti alloys is relatively high, in relationship to the titanium content the nitriding reactivity, the ability to nitride, is reduced, and an adequate surface hardness was not developed for cutting at 750 s.f.m. This was the case with the alloy V-72 Mo-8 Ti which is not within the scope of our invention.

Furthermore, adequate surface hardness and cutting performance is not achieved in such alloys in which the titanium content is too high such as the alloy V-15 Mo-55 Ti even though in such alloy, when nitrided, a greater amount of reaction is observed by metallography and weight pick-up than in the V-72 Mo-8 Ti.

Along the same lines, in this ternary system, if the vanadium content is maintained at 65% and the titanium to molybdenum ratio is increased excellent cutting tool properties are observed in the nitrided composites. However, as this becomes higher cutting performance tends to decrease. Thus, the alloy V-17 Mo-17 Ti nitrided for 2 hours at 3000° F. provides an excellent tool insert which cuts extremely well at both 100 and 750 s.f.m.—whereas the nitrided alloy V-2 Mo-33 Ti, while a satisfactory cutting tool, shows a tendency to chip at 100 s.f.m. when nitrided adequately to cut at 750 s.f.m. Further decrease in molybdenum results in tool failure.

Additionally, we find that while the vanadium rich alloys, such as V-10 Mo-10 Ti can be successfully nitrided at for example 2800° F. for 2 hours to produce a satisfactory cutting tool (slight tendency toward cutter chipping when tested at 100 s.f.m.) with lower vanadium content as in the composition V-30 Mo-20 Ti nitrided for various times over the range 2800° F. to 3200° F. excellent cutting tools are produced.

Accordingly, in practicing the teachings hereof one should clearly stay within the compositional limits set forth in FIG. 6.

At this point reference should again be had to Table I. As seen therein both unalloyed vanadium and binary alloys of vanadium—(10–50) titanium when nitrided for 2 hours at 3100° F. failed the 100 s.f.m. cutting test in every instance.

We would point out that the following ternary alloys well passed the test criteria when nitrided at 2800° F. for 2 hours:

V-25 Mo-10 Ti
V-17 Mo-17 Ti

The following alloys well passed when nitrided at 3000° F. for 2 hours:

V-25 Mo-10 Ti
V-17 Mo-28 Ti
V-20 Mo-24 Ti
V-30 Mo-20 Ti

Additionally the following well passed; V-30 Mo-20 Ti nitrided for 4 hours at 2800° F. and for 2 hours at 3200° F.; and V-45 Mo-15 Ti nitrided for 4 hours at 3000° F.

In view of the foregoing, in nitriding our materials of the V-Mo-Ti system we find that nitriding at between 2800° and 3200° F. for from 2 to 4 hours produces excellent cutting tools.

Various examples of this V-W-Ti alloy system with nitriding temperatures and times are presented in Table I and the cutting test results are graphically shown in FIG. 5.

As in the alloy systems previously described, compositions falling within the boundary of the polygon formed by lines ABCDEFGA of FIG. 5 cover all of our columbium-tungsten-titanium nitrided materials which pass the criteria set forth above, satisfactory cutting at both 750 and 100 s.f.m., and also our preferred materials which pass these tests with very low wear.

From FIG. 5 it can be seen that in such nitrided ternary system the following compositional ranges are useful:

From:
   15% to 90% vanadium
   1% to 45% titanium
   2% to 80% tungsten and wherein the vanadium to titanium ratio is greater than 0.66:1.

Within such broad range of useful materials we find that the compositions falling within the following preferred range are especially useful as cutting tool materials when subjected to proper nitriding treatment as herein taught:

From:
   24% to 80% vanadium
   1% to 40% titanium
   5% to 60% tungsten and wherein the ratio of vanadium to titanium is greater than 1.4:1.

Such preferred range of V-W-Ti alloys for cutting tools is illustrated in the inner polygon formed by lines HIJKLH in FIG. 5 and it should be noted that within such polygon all of the nitrided materials are preferred as regards the 100 and 750 s.f.m. criterion set out herein when nitrided as herein taught.

Within this ternary system we find that one of the preferred alloys is of the composition V-20 W-15 Ti. Kinetic data for cutters of this alloy, initially weighing approximately 2 grams, treated in molecular nitrogen are as follows:

| Temperature, °F.: | Time, hrs. | Weight gain, mg./cm.$^2$ |
|---|---|---|
| 2,600 | 4 | 7.3 |
| 2,600 | 8 | 10.7 |
| 3,000 | 2 | 14.7 |
| 3,000 | 4 | 20.0 |

Under all of these conditions the nitrided composites effectively cut the test steel at both 100 and 750 s.f.m. and we find that wear resistance at 750 s.f.m. increases with increasing weight gain.

Within the compositional ranges shown in FIG. 5 (and as shown in Table I) we would point out that the following compositions, nitrided as shown are particularly useful as cutting materials meeting our test criteria:

V-10W-10 Ti (2800° F., 2 hrs.)
V-20W-15 Ti (3000° F., 2 hrs.)
V-42W-4.5 Ti (3000° F., 2 hrs.)
V-20W-24 Ti (3000° F., 2 hrs.)
V-10W-36 Ti (3000° F., 2 hrs.)
V-35W-20 Ti (2800° F., 2 hrs.)
V-40W-24 Ti (2800° F., 2 hrs.)
V-50W-10 Ti (3000° F., 2 hrs.)
V-60W-15 Ti (2800° F., 2 hrs.)

From the foregoing one may readily make certain generalizations regarding the nitrided ternary systems considered above. The present vanadium containing compositions generally can be reacted at somewhat lower temperatures than our corresponding columbium or tantalum alloys and furthermore high cutting performance is readily achieved in the vanadium containing systems at relatively low nitriding temperatures even with materials highly alloyed with tungsten.

More specifically, with our preferred ternary vanadium alloys nitriding at from 2800° to 3000° F. for 2 hours produces good cutting materials. For vanadium rich alloys or those with relatively low tungsten generally lower nitriding temperatures and/or shorter times may be used. For compositions with higher tungsten, outside of our preferred range, we nitrided at 3200° F. for 2 hours to produce useful cutting tools.

HIGHER ALLOYED SYSTEMS

Representative samples of higher alloyed materials falling within the scope hereof, nitriding conditions and cutting test results on the Rc 43–45 test steel are set forth in Table II.

When one wishes to make use of the higher alloyed systems of our invention certain compositional ratios and formulae must be employed in some cases to determine whether or not the material will be useful to meet the cutting test criteria established in this specification. These factors have been briefly noted before but now they should be considered in some detail to fully understand the teachings hereof. A modest mathematical statement is required.

In the present specification and claims the following ratios shall have the following meanings:

$$\text{Ratio } A = \frac{\text{Cb}}{\text{Cb}+\text{Ta}+\text{V}}$$

(that is, the concentration of columbium to total columbium, tantalum and vanadium). Similarly $$\text{Ratio } B = \frac{\text{Ta}}{\text{Cb}+\text{Ta}+\text{V}}$$

$$\text{Ratio } C = \frac{\text{V}}{\text{Cb}+\text{Ta}+\text{V}}$$

$$\text{Ratio } D = \frac{\text{Mo}}{\text{Mo}+\text{W}}$$

$$\text{Ratio } E = \frac{\text{W}}{\text{Mo}+\text{W}}$$

When, in the present alloy systems, more than 1 metal of the group columbium, tantalum and vanadium is present the maximum total content, in terms of weight percent of such metals must be equal to or less than the total of 85 (Ratio $A$)+88 (Ratio $B$)+90 (Ratio $C$)

and the minimum content thereof when tungsten and/or molybdenum are present must be equal to or greater than the total of

[(Ratio $A$)+(Ratio $B$)]

[10 (Ratio $E$)+25 (Ratio $D$)]+15 (Ratio $C$)

Furthermore, when there is more than 1 metal of the group columbium, tantalum and vanadium present the maximum amount of titanium permitted in the alloy system is equal to or less than the amount determined by the formula 45 (Ratio $A$+Ratio $C$)+35 (Ratio $B$)

and the ratio of the content of such metals to the titanium must be greater than the ratio determined by Ratio $A$+Ratio $B$+0.66 (Ratio $C$):1

Additionally, when both tungsten and molybdenum are present the maximum amount thereof is determined by the formula 60 (Ratio $A$+Ratio $C$) (Ratio $D$)
 +50 (Ratio $B$) (Ratio $D$)+80 (Ratio $E$)

We would further note that when columbiaum alone is used of Group A metals and both molybdenum and

TABLE II

| Alloy composition, weight percent | Nitriding treatment | | Cutting test results at speed | |
|---|---|---|---|---|
| | °F. | Hours | 750 s.f.m. | 100 s.f.m. |
| 35 Cb-35 Ta-10 Mo-20 Ti | 3,600 | 2 | P* | P* |
| 30 Cb-30 Ta-10 Mo-10 W-20 Ti | 3,600 | 2 | P* | P* |
| 50 Cb-12.5 Mo-12.5 W-25 Ti | 3,600 | 2 | P* | P* |
| 52.4 Ta-12.5 Mo-12.5 W-22.5 Ti | 3,600 | 2 | P* | P* |
| 30 Cb-20 V-10 Mo-40 Ti | 3,000 | 4 | P* | P |
| 29 Cb-39 V-8 Mo-24 Ti | 2,800 | 2 | P* | P |
| 37 Cb-30 V-8 Mo-25 Ti | 2,800 | 2 | P* | P* |
| 37 Cb-30 V-8 Mo-25 Ti | 2,800 | 6 | P* | P* |
| 13 Cb-25 Ta-34 V-7 Mo-21 Ti | 2,800 | 2 | P* | P |
| 53 Ta-22 V-7 Mo-18 Ti | 2,800 | 2 | P* | P* |
| 18 Cb-36 Ta-10 V-18 Mo-18 Ti | 3,200 | 2 | P* | P* |
| 12 V-42 Ta-26 Mo-20 Ti | 3,400 | 2 | P* | P* |
| 25 Cb-25 Ta-25 V-15 Ti-5 W-5 Mo | 3,000 | 2 | P* | P* |

NOTE.—In the foregoing Table II the same legend is employed as in Table I.

tungsten are present the minimum amount of columbium required is determined by the formula 10 (Ratio $E$)+20 (Ratio $D$)

In the present alloy systems, the minimum amount of titanium is 1% and the minimum amount of tungsten and/or molybdenum is 2%.

Let us next explain how such ratios and formulae apply in determining useful composites falling within the scope hereof:

As noted above one of the better alloys is

37 Cb-30 V-8 Mo-25 Ti

Thus in the foregoing formulas as applied to sush composition:

$$\text{Ratio } A = \frac{37}{37+0+30} = .55$$

$$\text{Ratio } B = \frac{0}{37+0+30} = 0$$

$$\text{Ratio } C = \frac{30}{37+0+30} = .45$$

$$\text{Ratio } D = \frac{0}{8+0} = 1$$

$$\text{Ratio } E = \frac{0}{8+0} = 0$$

The maximum allowed content of Cb, Ta and V is then given by the formula $$85 (.55) + 88 (0) + 90 (.45) = 87$$

The actutal amount of Cb, Ta and V in such system is $$37 + 0 + 30 = 67 \text{ weight percent}$$

and since such actual amount is less than the permitted 87 weight percent this requirement is met.

The lower limit of combined Cb, Ta and V is determined by $$10 (.55) + 10 (0) + 15 (.45) = 12.25$$

and since the actual amount of 67 is greater than this value such minimum requirement is also met.

The titanium content is 25%. Maximum titanium, as governed by the formula set forth above would be $$45 (.55 + .45) + 35 (0) = 45.0 \text{ weight percent}$$

and thus since 25 weight percent is present and is less than 44.6 this criteria for a useful material is met.

Another aspect of titanium content is governed by the ratio

Ratio $A$ + Ratio $B$ + 0.66 (Ratio $C$):1

With this alloy:

$$.55 + 0 + 0.66 (.45:1 = .85:1$$

Actual titanium content as a ratio of Cb, Ta and V=67:25 or clearly greater than .85:1 which meets this requirement.

In this composite the total molybdenum and tungsten content is 8 weight percent and thus the greater than 2% limit is met. The maximum is determined by the formula 60 (Ratio $D$) + 80 (Ratio $E$)

Thus:

$$60 (1) + 80 (0) = 60 \text{ weight percent}$$

Since this value of 60 is greater than the actual of 8 the maximum Mo and W contents requirements is met.

Accordingly, the nitride alloy 37 Cb-30 V-8 Mo-25 Ti falls within the scope of our invention and as shown above is clearly useful in accordance with our teachings.

Consider next an alloy conosisting of

30 Cb-30 Ta-30 V-2 Ti-4 Mo-4 W

Using the foregoing formulae:

$$A = \frac{30}{90} = .33$$

$$B = \frac{30}{90} = .33$$

$$C = \frac{30}{90} = .33$$

Actual Cb, Ta and V is 90 weight percent while the total permitted amount is $$85 (.33) + 88 (.33) + 90 (.33) = 87$$

Thus, this alloy would fall outside of the scope hereof.

We would note that such ratios need only be used towards the end of the various compositional ranges hereof and then only in the higher alloyed systems. Thus, where there is more than one of the metals columbium, tantalum and vanadium and wherein the total content thereof as regards the maximum is between 85 and 90 percent the ratios should be used. If these Group A metals total more than 90% they fall outside of the scope hereof automatically and are not useful for the purposes of this inventon. If total Group A content falls between 25% and 85% the formula need not be used, assuming of course that the other compositional limitations are met for these will be useful materials falling within the scope of our invention. The formula again comes into play when total Group A ranges between 10% and 25% of the alloy to be nitrided assuming again that more than one such metal is present. If total Group A content is less than 10 the materials again automtically fall outside the scope hereof.

Similarly the formula need only be applied in so far as when maximum titanium content is concerned if tantalum is present with either columbium or vanadium or both and the amount of titanium ranges between 35% and 45%. If the titanium is present in amounts greater than 45% it does not come within the scope of our invention and if it is less than 35% but greater than 1% then the formula for maximum required titanium need not be used.

Similarly, when only one or both columbium and tantalum are present, but vanadium is not included in the composition to be nitrided, the ratio of columbium and/or tantalum content to titanium content must be greater than 1. The ratio of less than 1 only need be considered with those alloys containing vanadium.

In the case of the metals molybdenum and tungsten, where both are usd and only columbium and/or vanadium is present the formulae pertinent thereto need only be applied when the combined total Mo and W is between 60% and 80%. If the weight percent content is between 2% and 60% molybdenum and/or tungsten the material is good by our criteria and falls within the scope hereof.

When tantalum alone is present of Group A metals, the formula need only be used, as regards maximum Mo and W when there is more than 50% molybdenum and tungsten present.

The utility of one of said higher alloyed composites, 37 Cb-30 V-8 Mo-25 Ti, may readily be seen from the following table.

| Nitriding treatment | | Weight gain, (mg./cm.²) | Uniform tool wear | | | |
| --- | --- | --- | --- | --- | --- | --- |
| | | | 100 s.f.m. | | 750 s.f.m. | |
| ° F. | Hours | | Volume removed, cu. in. | Wear, in. | Volume removed, cu. in. | Wear, in. |
| 2,800 | 2 | 11.3 | {0.9 {2.0 | 0.004 0.007 | 2.0 3.3 | 0.003 0.004 |
| 2,800 | 4 | 17 | {1.6 {3.4 | 0.004 0.006 | 2.6 5.5 | 0.005 0.006 |

These tests have shown that extremely low tool wear rates are observed even when the tests are extended well beyond the cutting of 2 cubic inches. This high performance is achieved in the Cb-V-Mo-Ti alloy at a molybdenum content of 8%. In addition Table II shows preferred performance for a number of complex compositions at similarly low molybdenum content. For comparison the lower molybdenum content for the preferred compositions in the Cb-Mo-Ti and V-Mo-Ti systems is 8 and 11% respectively. Therefore, it appears that a synergistic effect is operative in these complex alloys.

Compositions containing various combinations of these elements falling within the general ranges shown to be preferred in the ternary systems are preferred in these complex systems as well. A number of these complex preferred materials are shown in Table II.

In the disclosure thus far we have considered nitrided composite materials which cut the test steel at both 100 and 750 s.f.m. There are a few additional features of our materials that we should next consider.

Within the compositional ranges herein disclosed and claimed we find a group of nitrided materials overlap our preferred compositions and additionally cut the test steel (Rc 43–45) at much higher speeds and thus offer considerable utility as high speed cutting materials. Nitrided alloys within this group contain at least 74% of the metals columbium, tantalum and/or vanadium plus titanium plus molybdenum and/or tungsten.

When columbium is used alone of its group it ranges from 74% to 85%; tantalum alone ranges from 74% to 88% and vanadium alone ranges from 74% to 90%. When two or more of such metals are present the maximum content of this group ranges between 85% and 90% and is determined by the formula 85 (Ratio $A$)+88 (Ratio $B$) and 90 (Ratio $C$)

which is described above.

The titanium ranges from 1% to 24%; and the tungsten and/or molybdenum content ranges from 2% to 25%.

Cutting tests were run on the test steel at 1250 s.f.m. at a feed rate of 0.005 in./rev. and a depth of cut of 0.020 in., the data from which is presented in Table III.

TABLE III

| Alloy composition | Nitriding treatment | | Cutting test results at 1,250 s.f.m. | |
|---|---|---|---|---|
| | ° F. | Hours | Volume of material removed, in.³ | Uniform nose wear, in. |
| 80 Ta-10 W-10 Ti | 3,600 | 2 | 0.9 | 0.007 |
| 80 Ta-10 Mo-10 Ti | 3,600 | 2 | 1.3 | 0.007 |
| 88 Ta-6 W-6 Ti | 3,600 | 1 | 1.5 | 0.006 |
| 74 Ta-4.4 Mo-21.5 Ti | 3,600 | 2 | 1.2 | 0.005 |
| 80 V-10 W-10 Ti | 3,200 | 2 | 0.2 | 0.020 |
| 80 Cb-10 Mo-10 Ti | 3,600 | 2 | 0.6 | 0.005 |
| 76 Cb-19 W-5 Ti | 3,600 | 1 | 0.9 | 0.012 |
| C-6 grade tungsten carbide | | | 0.07 | ¹ 0.030 |

¹ Failed.

It will be noted that all of the present materials are exceptionally better than the C-6 grade sintered tungsten carbide.

Most of these compositions fall outside of our preferred range for use at 100 and 750 s.f.m. because they show a tendency toward chipping at the lower cutting speeds.

Upon being nitrided these materials may be considered as being ceramic-like. In addition to having utility for high speed cutting purposes they are also useful in terms of their abrasion resistant features.

Such desirable features are found in certain compositional ranges of the nitrided ternary systems hereof.

Of the system columbium-tungsten-titanium (FIG. 1) these useful high speed cutting materials are those falling within the polygon formed by lines MBCNM of such figure. In terms of composition such materials prior to nitriding as herein taught may be characterized as follows:

From:
 74% to 85% columbium;
 2% to 25% tungsten; and
 1% to 24% titanium.

In the system columbium-molybdenum-titanium (FIG. 2) such useful, high speed cutting materials are of the composition falling within the polygon formed by lines MEFNM of such materials, prior to nitriding may be characterized as follows:

From:
 74% to 85% columbium;
 2% to 25% molybdenum; and
 1% to 24% titanium

Thus, it should be noted that the molybdenum and tungsten are completely interchangeable in the columbium-titanium base materials insofar as the use of nitrided high speed cutting and abrasion resistant materials are concerned. Both molybdenum and tungsten may be present to a total amount ranging from 2% to 25%.

In the system tantalum-tungsten-titanium (FIG. 3) such useful, high cutting materials are of the composition falling within the polygon formed by lines MDENM of such figure. In terms of composition such materials, prior to nitriding may be characterized as follows:

From:
 74% to 88% tantalum
 2% to 25% tungsten; and
 1% to 24% titanium

In the system tantalum-molybdenum-titanium (FIG. 4) such useful, high speed cutting materials are of the composition falling within the polygon formed by lines MDENM of such figure. In terms of composition such materials, prior to nitriding are characterized as follows:

From:
 74% to 88% tantalum
 2% to 25% molybdenum; and
 1% to 24% titanium

We would accordingly note than the molybdenum and tungsten are completely interchangeable in the tantalum-titanium base material insofar as this aspect of the invention is concerned and that both may be present in a combined total amount ranging from 2% to 25%.

In the system vanadium-tungsten-titanium (FIG. 5), the high speed cutting materials are of the composition falling within the polygon formed by lines MEFNM of such figure. In terms of composition such materials, prior to nitriding are characterized as follows:

From:
 74% to 90% vanadium;
 2% to 25% tungsten; and
 1% to 24% titanium

In the system-molybdenum-titanium (FIG. 6) the high speed cutting materials are of the composition falling within the polygon formed by the lines MDENM of such figures. In terms of weight percent such ternary compositions prior to nitriding are as follows:

From:
 74% to 90% vanadium;
 2% to 25% molybdenum; and
 1% to 24% titanium.

In view of the marked similarity in properties and the ability to cut hardened steel (Rc 43–45) at 1250 s.f.m. certain general compositional principles may readily be seen from the foregoing.

First of all, regardless of what other metals are present the titanium ranges from 1% to 24%.

Secondly, in all such compositions the tungsten and/or molybdenum ranges from 2% to 25%.

Thirdly, the minimum content of columbium, tantalum and/or vanadium is 74%.

The one question that may arise concerns the upper limit of two or more metals of the group columbium, tantalum and vanadium in view of their varying, but interchangeable upper limits. If the total of two or more such metals is up to or less than 85%, there is no question that they are useful as herein taught. However, as previously discussed the compositional question comes into play when there are two or more of such metals totalling between 85% and 90% the alloy to be nitrided. For this determination the same upper limit formula is used as before, namely it cannot be greater than 85 (Ratio $A$)+88 (Ratio $B$) or 90 (Ratio $C$)

The importance of the invention is our discovery that selected alloy compositions can be nitrided and thus yield extremely good performance for the test citeria described previously. It is understood that such alolys can be formed by a number of techniques such as casting, metal working, coating, cladding, powder forming methods, etc. The ability to directly hot and/or cold form the wrought material is useful in shaping certain parts prior to nitriding. Selected composition ranges that are amenable to nitriding offer direct fabricational opportunities.

As previously noted, some of the alloys that we examined were directly fabricated to sheet by either hot or cold rolling prior to nitriding. All such materials were characterized as having a hardness of less than 400 diamond pyramid numerals (DPN)—which is approximately equivalent to 70 on the Rockwell A scale (Ra)—in the as-cast condition.

We have found that the materials falling within our useful composition ranges defined in FIGS. 1 to 6, and having a Ti/Mo or W ratio greater than one, satisfy this requirement and therefore are fabricable. The following Table IV gives hardness data obtained for representative samples of such alloys in the as-cast condition.

TABLE IV

| Alloy composition: | Hardness Ra | DPN |
|---|---|---|
| Cb-9 W-20 Ti | 58 | |
| Cb-30 W-20 Ti | 57 | |
| Cb-17 W-17 Ti | 61.5 | 250 |
| Cb-10 Mo-30 Ti | 61 | 245 |
| Cb-10 Mo-40 Ti | 57 | |
| Cb-20 Mo-20 Ti | 64 | 283 |
| Ta-10 W-10 Ti | 61 | 245 |
| Ta-10 W-20 Ti | 63 | 270 |
| Ta-20 W-30 Ti | 59 | 240 |
| Ta-18 W-18 Ti | 68 | 350 |
| Ta-5 Mo-10 Ti | 64 | 282 |
| Ta-4 Mo-22 Ti | 60 | 240 |
| Ta-10 Mo-10 Ti | 68 | 350 |
| V-10 Mo-10 Ti | 64 | 282 |
| V-17 Mo-28 Ti | 69.5 | 375 |
| V-10 W-10 Ti | 63 | 270 |
| V-10 W-36 Ti | 69 | 360 |
| V-20 W 40 Ti | 67 | 330 |
| 25 Cb-25 Ta-25 V-15 Ti-5 W-5 Mo | 66 | 315 |
| (The following materials are not readily fabricable) | | |
| Cb-30 Mo-15 Ti | 73 | 450 |
| Ta-30 Mo-20 Ti | 77 | 550 |
| V-50 W-10 Ti | 75 | 500 |

In view of the above, this invention also includes an additional preferred embodiments hereof, those alloys which are both readily fabricable and capable of being nitrided to form abrasion resistant and cutting products.

For a more detailed consideration of the fabricability aspects hereof reference should again be had to the ternary composition diagrams, FIGS. 1 through 6.
tions falling within the polygon formed by lines In the columbium-tungsten-titanium system (FIG. 1) such preferred fabricable materials are those compositions falling within the polygon formed by lines PQFABPQ. Compositions falling to the left of the PQ lines are those having a titanium to tungsten ratio of one or greater. In terms of weight percent, such ternary compositions prior to nitriding are as follows:

From:
  33% to 85% columbium;
  2% to 33% tungsten; and
  7.5% to 45% titanium.

In the columbium-titanium base alloys, as may readily be seen from FIG. 2, the molydenum is interchangeable with the tungsten of the alloy system shown in FIG. 1. With columbium-molybdenum-titanium such fabricable materials are defined by the polygon PQBEDP and in terms of weight percent the compositions are as follows:

From:
  33% to 85% columbium;
  2% to 33% molybdenum; and
  7.5% to 45% titanium.

Readily fabricable compositions of the system tantalum-tungsten-titanium are shown in FIG. 3. These are the alloys encompassed within the polygon formed by lines PQBCDP of such figure and in terms of weight percent such ternary compositions are as follows:

From:
  34% to 88% tantalum;
  2% to 33% tungsten; and
  6% to 35% titanium.

The molybdenum addition to the tantalum-titanium base for these fabricable alloys is shown in FIG. 4. These are the alloys encompassed within the polygon formed by lines PQBCDP of such figure and in terms of weight percent such ternary compositions are as follows:

From:
  34% to 88% tantalum;
  2% to 33% molybdenum; and
  6% to 35% titanium.

From the foregoing the interchangeability of molybdenum for all or part of the tungsten is quite apparent.

In the vandium-titanium base materials, FIGS 5 and 6, it is likewise true that the tungsten and molybdenum are interchangeable and may substitute completely or in part for each other.

In FIG. 5 these readily fabricable alloys are defined by polygon PQCDEP and the compositions in terms of weight percent are:

From:
  25% to 90% vanadium;
  2% to 37% tungsten; and
  6% to 35% titanium.

In the alloy system V-Mo-Ti, FIG. 6, such composition is defined by the polygon PQBCDP and in terms of weight percent the following:

From:
  25% to 90% vanadium;
  2% to 37% molybdenum; and
  6% to 35% titanium.

Accordingly, it should be understood that in the readily fabricable alloys of this invention, it is of critical import that the ratio of titanium to molybdenum and/or tungsten must be equal to or greater than one. This is readily seen by line PQ in all of the aforedescribed ternary system diagrams.

Within such readily fabricable alloy system there is yet another even more desired group of alloys, namely those which not only are readily fabricable but likewise are our preferred cutting materials. These are truly the materials of commercial significance.

In the system Cb-W-Ti, (FIG. 1) such materials fall within the compositional polygon RSIJR and consist essentially of:

From:
  43% to 75% columbium;
  10% to 29% tungsten; and
  12.5% to 36% titanium.

Such preferred materials in the Cb-Mo-Ti are those falling within the polygon RSIJR of FIG. 2.
Compositionally, this includes From:
  45% to 75% columbium;
  8% to 27% molybdenum; and
  12.5% to 35% titanium.

We would note that in said preferred alloy systems for use herein the ratio of titanium to molybdenum and/or tungsten is one or more.

In the system Ta-W-Ti, such preferred ternary alloys are those falling within the polygon RSIJR of FIG. 3, viz:

From:
    48% to 78% tantalum;
    5% to 26% tungsten; and
    11% to 34% titanium.

In the system Ta-Mo-Ti such preferred ternary alloys are those falling within the polygon RSIJR of FIG. 4, viz:

From:
    48% to 78% tantalum;
    5% to 26% molybdenum; and
    11% to 34% titanium.

In the system V-W-Ti such preferred ternary alloys are those falling within the polygon RSIJR of FIG. 5, viz:

From:
    41% to 80% vanadium;
    5% to 29% tungsten; and
    10% to 40% titanium.

In the system V-Mo-Ti such preferred ternary alloys are those falling within the polygon JRIJ of FIG. 6, viz:

From:
    43% to 78% vanadium;
    11% to 28% molybdenum; and
    11% to 35% titanium.

In addition to being readily fabricated in the form of solid stock it should also be noted that such alloys may be likewise fabricated by standard powder techniques.

The usefulness of these nitrided composites as high speed cutting tool materials for hardened steel has been described. In addition, cutting of other difficult-to-machine materials has been demonstrated. For example, many of our nitrided composites will cut 2 cu. in. from a cobalt base alloy (Haynes 25) at 400 s.f.m. with low tool wear whereas sintered carbide will fail under these conditions. Our testing has shown that our materials exhibit excellent abrasion resistance as well. The nitrided materials are resistant to a variety of strong acids.

Thus, applications involving both corrosion and abrasion can be considered.

More particularly, the present nitrided materials find utility, among others, for use in rotary files and burrs, taps, drills, dies, rotary seals, nozzles and tube liners.

It will be understood that various modifications and variations may be effected without departing from the spirit or scope of the novel concepts of our invention.

We claim as our invention:

1. A graded nitrided material having a nitrogen pick-up of at least 1 milligram per square centimeter of surface area having excellent cutting and abrasion resistance properties consisting essentially of at least one metal selected from each of the Groups A, B and C wherein Group A consists of columbium, tantalum and vanadium; Group B is titanium and Group C consists of molybdenum and tungsten and wherein:

(a) when only columbium and molybdenum are present with titanium the range for the columbium content is from about 20% to 85%;

(b) when only columbium and tungsten are present with titanium the range for the columbium content is from about 10% to 85%;

(c) when only columbium, molybdenum and tungsten are present with titanium the minimum amount of columbium required is determined by the formula $$10 \text{ (Ratio } E) + 20 \text{ (Ratio } D)$$

and the maximum content of columbium is about 85%;

(d) when only tantalum and molybdenum are present with titanium the range for the tantalum content is from about 25% to 88%;

(c) when only tantalum and tungsten are present with titanium the range of the tantalum content is about 10% to 88%;

(f) when only tantalum, molybdenum and tungsten are present with titanium the minimum amount of tantalum required is determined by the formula $$10 \text{ (Ratio } E) + 25 \text{ (Ratio } D)$$

and the maximum content of tantalum is about 88%;

(g) when only vanadium and a metal selected from the group consisting of molybdenum and tungsten and combinations thereof are present with titanium the range for the vanadium content is about 15% to 90%;

(h) when more than one metal of the group columbium, tantalum and vanadium are present with only molybdenum and titanium the minimum total content of the metals columbium, tantalum and vanadium must be at least equal to the amount of $$20 \text{ (Ratio } A) + 25 \text{ (Ratio } B) + 15 \text{ (Ratio } C)$$

(i) when more than one metal of the group columbium, tantalum and vanadium are present with only tungsten and titanium, the minimum total content of the metals columbium, tantalum and vanadium must be at least equal to the amount of $$10 \text{ (Ratio } A) + 10 \text{ (Ratio } B) + 15 \text{ (Ratio } C)$$

(j) when more than one metal of the group columbium, tantalum and vanadium are present with molybdenum, tungsten and titanium, the minimum total content of the metals columbium, tantalum and vanadium must be at least equal to the amount of $$[(\text{Ratio } A) + (\text{Ratio } B)]$$
$$[10 \text{ (Ratio } E) + 25 \text{ (Ratio } D)] + 15 \text{ (Ratio } C)$$

(k) when more than one metal of the group columbium, tantalum and vanadium are present the maximum total content thereof must be equal to or less than $$85 \text{ (Ratio } A) + 88 \text{ (Ratio } B) + 90 \text{ Ratio } C)$$

(l) when titanium is present with only columbium and a metal selected from the group molybdenum and tungsten and combinations thereof, the titanium content ranges from about 1% to 45% and the columbium to titanium ratio is greater than 1;

(m) when titanium is present with only tatalum and a metal selected from the group molybdenum and tungsten and combinations thereof, the titanium content ranges from about 1% to 35% and the tantalum to titanium ratio is greater than 1;

(n) when titanium is present only with vanadium and a metal selected from the group molybdenum and tungsten and combinations thereof, the titanium content ranges from about 1% to 45% and the vanadium to titanium ratio is greater than 0.66;

(o) when titanium is present with more than one metal of the group columbium, tantalum and vanadium and a metal selected from the group molybdenum and tungsten and combinations thereof, the maximum content of titanium must be equal to or less than $$45 \text{ (Ratio } A + \text{Ratio } C) + 35 \text{ (Ratio } B)$$

and the ratio of the content of the metals columbium, tantalum and vanadium to titanium must be equal to or greater than the ratio of $$(\text{Ratio } A) + (\text{Ratio } B) + 0.66 \text{ (Ratio } C):1$$

and the minimum titanium content is 1%;

(p) when only molybdenum, titanium and a metal selected from group columbium and vanadium and combinations thereof are present, the range for molybdenum content is from about 2% to 60%;

(q) when only molybdenum, titanium and tantalum are present the range of the molybdenum content is from about 2% to 50%;

(r) when only tungsten, titanium and a metal selected from the group columbium, tantalum and vanadium and combinations thereof are present the range for tungsten content is from about 2% to 80%; and (s) when molybdenum, tungsten, titanium and a metal selected from the group columbium, tantalum, vanadium and combinations thereof are present the maximum total content of molybdenum and tungsten must be equal to or less than 60 (Ratio $A$+Ratio $C$) (Ratio $D$)+

50 Ratio $B$) (Ratio $D$)+80 (Ratio $E$)

and the minimum molybenum and tungsten content is 2% and wherein:

in the foregoing in weight percent concentrations $$\text{Ratio } A = \frac{Cb}{Cb+Ta+V}$$

$$\text{Ratio } B = \frac{Ta}{Cb+Ta+V}$$

$$\text{Ratio } C = \frac{V}{Cb+Ta+V}$$

$$\text{Ratio } D = \frac{Mo}{Mo+W}$$

$$\text{Ratio } E = \frac{W}{Mo+W}$$

2. The material as defined in claim 1 wherein the surface microhardness thereof is at least 1000 diamond pyramid numerals and the reaction depth to which such hardness is developed is at least 0.5 mil.

3. The material as defined in claim 1 consisting essentially of columbium, tungsten and titanium and the ranges for such metals are as follows:

from about:
   10% to 85% columbium;
   2% to 80% tungsten; and
   1% to 45% titanium.

4. The material as defined in claim 1 consisting essentially of columbium, molybdenum and titanium and the ranges for such metals are as follows:

from about:
   20% to 85% columbium;
   2% to 60% molybdenum; and
   1% to 45% titanium.

5. The material as defined in claim 1 consisting essentially of tantalum, tungsten and titanium and the ranges for such metals are as follows:

from about:
   10% to 88% tantalum;
   2% to 80% tungsten; and
   1% to 35% titanium.

6. The material as defined in claim 1 consisting essentially of tantalum, molybdenum and titanium and the ranges for such metals are as follows:

from about:
   25% to 88% tantalum;
   2% to 50% molybdenum; and
   1% to 35% titanium.

7. The material as defined in claim 1 consisting essentially of vanadium, tungsten, and titanium and the ranges for such metals are as follows:

from about:
   15% to 90% vanadium;
   2% to 80% tungsten; and
   1% to 45% titanium.

8. The material as defined in claim 1 consisting essentially of vanadium, molybdenum and titanium and the ranges for such metals are as follows:

from about:
   15% to 90% vanadium;
   2% to 60% molybdenum; and
   1% to 45% titanium.

9. The material as defined in claim 1 consisting essentially of columbium, tungsten and titanium and the ranges for such metals are as follows:

from about:
   24% to 75% columbium;
   10% to 60% tungsten;
   3% to 36% titanium;

and wherein the columbium to titanium ratio is greater than 1.5 to 1.

10. The material as defined in claim 1 consisting essentially of columbium, molybdenum and titanium and the ranges for such metals are as follows:

from about:
   25% to 75% columbium;
   8% to 60% molybdenum;
   4% to 35% titanium;

and wherein the columbium to titanium ratio is greater than 1.6 to 1.

11. The material as defined in claim 1 consisting essentially of tantalum, tungsten and titanium and the ranges for such metals are as follows:

from about:
   26% to 78% tantalum;
   5% to 60% tungsten;
   1% to 34% titanium;

and wherein the tantalum to titanium ratio is greater than 1.8 to 1.

12. The material as defined in claim 1 consisting essentially of tantalum, molybdenum and titanium and the ranges for such metals are as follows:

from about:
   39% to 78% tantalum;
   5% to 40% molybdenum;
   1% to 34% titanium;

and wherein the tantalum to titanium ratio is greater than 1.8 to 1.

13. The material as defined in claim 1 consisting essentially of vanadium, tungsten and titanium and the ranges for such metals are as follows:

from about:
   24% to 80% vanadium;
   5% to 60% tungsten;
   1% to 40% titanium;

and wherein the vanadium to titanium ratio is greater than 1.4 to 1.

14. The material as defined in claim 1 consisting essentially of vanadium, molybdenum and titanium and the ranges for such metals are as follows:

from about:
   24% to 78% vanadium;
   11% to 60% molybdenum;
   1% to 35% titanium;

and wherein the vanadium to titanium ratio is greater than 1.5 to 1.

15. A graded nitrided material having a nitrogen pickup of at least 1 milligram per square centimeter of surface area and having excellent cutting and abrasion resistance properties consisting essentially of at least one metal selected from each of the Groups A, B and C wherein Group A consists of columbium, tantalum and vanadium; Group B is titanium and Group C consists of molybdenum and tungsten and wherein:

(a) when only columbium, titanium and a metal selected from the group molybdenum and tungsten and combinations thereof are present the range of columbium content is from about 74% to 85%;

(b) when only tantalum, titanium and a metal selected from the group molybdenum and tungsten and combinations thereof are present the range of tantalum content is from about 74% to 88%;

(c) when only vanadium, titanium and a metal selected from the group molybdenum and tungsten and combinations thereof are present the range of vanadium is from about 74% to 90%;

(d) when more than one metal of the group columbium, tantalum and vanadium are present with titanium and a metal selected from the group molybdenum and tungsten and combinations thereof the minimum total content of said first group of metals is 74% and the maximum content thereof must be equal to or less than 85 (Ratio $A$) + 88 (Ratio $B$) + 90 (Ratio $C$)

(e) from 1% to 24% titanium; and
(f) from 2% to 25% of a metal selected from the group consisting of molybdenum and tungsten and combinations thereof; and wherein in the foregoing $$\text{Ratio } A = \frac{Cb}{Cb+Ta+V}$$
$$\text{Ratio } B = \frac{Ta}{Cb+Ta+V}$$
$$\text{Ratio } C = \frac{V}{Cb+Ta=V}$$

16. The material as defined in claim 15 consisting essentially of columbium, tungsten and titanium, and the ranges of such metals are as follows:

from:
74% to 85% columbium;
2% to 25% tungsten; and
1% to 24% titanium.

17. The material as defined in claim 15 consisting essentially of columbium, molybdenum and titanium, and the ranges of such metals are as follows:

from:
74% to 85% columbium;
2% to 25% moylbdenum; and
1% to 24% titanium.

18. The material as defined in claim 15 consisting essentially of tantalum, tungsten and titanum, and the ranges of such metals are as follows:

from:
74% to 88% tantalum;
2% to 25% tungsten; and
1% to 24% titanium.

19. The material as defined in claim 15 consisting essentially of tantalum, molybdenum and titanium, and the ranges of such metals are as follows:

from:
74% to 88% tantalum;
2% to 25% molybdenum; and
1% to 24% titanium.

20. The material as defined in claim 15 consisting essentially of vanadium, tungsten and titanium, and the ranges of such metals are as follows:

from:
74% to 90% vanadium;
2% to 25% tungsten; and
1% to 24% titanium.

21. The material as defined in claim 15 consisting essentially of vanadium, molybdenum and titanium, and the ranges of such metals are as follows:

from:
74% to 90% vanadium;
2% to 25% moylbdenum; and
1% to 24% titanium.

22. The material as defined in claim 15 consisting essentially of columbium, moylbdenum, tungsten and titanium and the ranges of such metals are as follows:

from:
74% to 85% columbium;
2% to 25% aggregate moylbdenum and tungsten; and
1% to 24% titanium.

23. The material as defined in claim 15 consisting essentially of tantalum, moylbdenum, tungsten and titanium and the ranges of such metals are as follows:

from:
74% to 88% tantalum;
2% to 25% aggregate moylbdenum and tungsten; and
1% to 24% titanium.

24. The material as defined in claim 15 consisting essentially of vanadium, molybdenum, tungsten and titanium and the ranges of such metals are as follows:

from:
74% to 90% vanadium;
2% to 25% aggregate molybdenum and tungsten; and
1% to 24% titanium.

25. The material as defined in claim 1 wherein the ratio of the titanium content to the molybdenum content if molybdenum alone is selected; the tungsten content if tungsten alone is selected; and to the combined contents of molybdenum and tungsten, if both said metals are selected; is greater than 1.

26. The material as defined in claim 25 consisting essentially of columbium, tungsten and titanium and the ranges of such metals are as follows:

from:
33% to 85% columbium;
2% to 33% tungsten; and
7.5 % to 45% titanium.

27. The material as defined in claim 25 consisting essentially of columbium, molybdenum and titanium and the ranges of such metals are as follows:

from:
33% to 85% columbium;
2% to 33% moylbdenum; and
7.5% to 45% titanium.

28. The material as defined in claim 25 consisting essentially of columbium, titanium, tungsten and molybdenum and the ranges of such metals are as follows:

from:
33% to 85% columbium;
7.5% to 45% titanium; and
2% to 33% aggregate tungsten and molybdenum.

29. The material as defined in claim 25 consisting essentially of tantalum, tungsten and titanium and the ranges of such metals are as follows:

from:
34 % to 88% tantalum;
2% to 33% tungsten; and
6% to 35% titanium.

30. The material as defined in claim 25 consisting essentially of tantalum, molybdenum and titanium and the ranges of such metals are as follows:

from:
34% to 88% tantalum;
2% to 33% molybdenum; and
6% to 35% titanium.

31. The material as defined in claim 25 consisting essentially of tantalum, titanium, tungsten and molybdenum and the ranges of such metals are as follows:

from:
34% to 88% tantalum;
6% to 35% titanium; and
2% to 33% aggregate tungsten and moylbdenum.

32. The material as defined in claim 25 consisting essentially of vanadium, tungsten and titanium and the ranges of such metals are as follows:

from:
25% to 90% vanadium;
2% to 37% tungsten; and
5% to 45% titanium.

33. The material as defined in claim 25 consisting essentially of vanadium, molybdeum and titanium and the ranges of such metals are as follows:

from:
25% to 90% vanadium;
2% to 37% molybdenum; and
5% to 45% titanium.

34. The material as defined in claim 25 consisting essentially of vanadium, titanium, tungsten and molybdenum and the ranges of such metals are as follows:

from:
25% to 90% vanadium;
5% to 35% titanium; and
2% to 37% aggregate tungsten and molybdenum.

35. The material as defined in claim 25 consisting essentially of columbium, tungsten and titanium and the ranges of such metals are as follows:

from:
43% to 75% columbium;
10% to 29% tungsten;
12.5% to 36% titanium;
and wherein columbium to titanium ratio is greater than 1.5 to 1.

36. The material as defined in claim 25 consisting essentially of columbium, molybdenum and titanium and the ranges of such metals are as follows:

from:
45% to 75% columbium;
8% to 27% molybdenum;
12.5% to 35% titanium;

and wherein the columbium to titanium ratio is greater than 1.6 to 1.

37. The material as defined in claim 25 consisting essentially of tantalum, tungsten and titanium and the ranges of such metals are as follows:

from:
48% to 78% tantalum;
5% to 26% tungsten;
11% to 34% titanium;
and wherein the tantalum to titanium ratio is greater than 1.8 to 1.

38. The material as defined in claim 25 consisting essentially of tantalum, molybdenum and titanium and the ranges of such metals are as follows:

from:
48% to 78% tantalum;
5% to 26% molybdenum;
11% to 34% titanium;
and wherein the tantalum to titanium ratio is greater than 1.8 to 1.

39. The material as defined in claim 25 consisting essentially of tantalum, titanium, molybdenum and tungsten and the ranges of such metals are as follows:

from:
48% to 78% tantalum;
11% to 34% titanium;
5% to 26% aggregate tungsten and molybdenum;
and wherein the tantalum to titanium ratio is greater than 1.8 to 1.

40. The material as defined in claim 25 consisting essentially of vanadium, tungsten and titanium and the ranges of such metals are as follows:

from:
41% to 80% vanadium;
5% to 29% tungsten;
10% to 40% titanium;
and wherein the vanadium to titanium ratio is greater than 1.4 to 1.

41. The material as defined in claim 25 consisting essentially of vanadium, molybdenum and titanium and the ranges of such metals are as follows:

from:
43% to 78% vanadium;
11% to 28% molybdenum;
11% to 35% titanium;
and wherein the vanadium to titanium ratio is greater than 1.5 to 1.

42. The material as defined in claim 1 wherein up to about 3% of the titanium content is replaced by zirconium.

References Cited
UNITED STATES PATENTS

| | | | |
|---|---|---|---|
| 2,804,410 | 8/1957 | Wyatt et al. | 148—133X |
| 3,011,927 | 12/1961 | Zelezny | 148—13.1X |
| 3,314,827 | 4/1967 | de Vries | 148—133X |
| 2,081,820 | 5/1937 | Kelly | 75—174X |
| 3,161,949 | 12/1964 | Dickinson et al. | 29—182.5 |

CHARLES N. LOVELL, Primary Examiner

U.S. Cl. X.R.

75—134; 148—32

UNITED STATES PATENT AND TRADEMARK OFFICE
CERTIFICATE OF CORRECTION

PATENT NO. : 3,549,427
DATED : December 22, 1970
INVENTOR(S) : John J. Rausch and Ray J. Van Thyne It is certified that error appears in the above-identified patent and that said Letters Patent are hereby corrected as shown below:

Column 2, line 38 "dispersions" should read -- dispersion --;

Column 3, line 63, "along" should read -- alone --;

Column 3, line 74, "(Ti [Zr]" should read -- (Ti [Zr]) --;

Column 6, line 48, for the composition Cb-1W-29Ti under the heading 100 s.f.m. "P" should read -- F --;

Column 8, line 44, "mil" should read -- mils --;

Column 15, line 72, "every" should read -- very --;

Column 18, between lines 33 and 34 insert -- VANADIUM-TUNGSTEN-TITANIUM SYSTEM --;

Column 20, line 50, "columbiaum" should read -- columbium --;

Column 21, line 9, "sush" should read -- such --;

Column 21, line 19, "O" should read -- 8 --;

Column 21, line 49, "(45:1" should read -- (45):1 --;

Column 21, line 61, "nitride" should read -- nitrided --;

Column 21, line 65, "conosisting" should read -- consisting --;

UNITED STATES PATENT AND TRADEMARK OFFICE
CERTIFICATE OF CORRECTION

PATENT NO. : 3,549,427
DATED : December 22, 1970
INVENTOR(S) : John J. Rausch and Ray J. Van Thyne It is certified that error appears in the above-identified patent and that said Letters Patent are hereby corrected as shown below:

Column 22, line 23, "automtically" should read -- automatically --;

Column 22, line 40, "usd" should read -- used --;

Column 24, line 44, after "system" insert -- vanadium --;

Column 25, line 4, "alolys" should read -- alloys --;

Column 25, line 57, delete "tions falling within the polygon formed by lines";

Column 27, line 73, "ase" should read -- are --;

Column 28, line 1, "c" should read -- (e) --;

Column 28, line 2, "of" should read -- for --;

Column 28, line 46, "tatalum" should read -- tantalum --;

Column 31, line 31, between "Ta" and "V", "=" should be -- + --;

Column 31, line 46, "moylbdenum" should read -- molybdenum --;

Column 32, line 6, "moylbdenum" should read -- molybdenum --;

Signed and Sealed this

Twenty-second Day of February 197

[SEAL]

Attest:

RUTH C. MASON
Attesting Officer

C. MARSHALL DANN
Commissioner of Patents and Trademarks